(12) United States Patent
Rico Alvarino et al.

(10) Patent No.: US 11,997,692 B2
(45) Date of Patent: May 28, 2024

(54) MULTICAST SIGNALING WITH FORWARD COMPATIBILITY

(71) Applicant: QUALCOMM Incorporated, San Diego, CA (US)

(72) Inventors: Alberto Rico Alvarino, San Diego, CA (US); Le Liu, Fremont, CA (US); Kazuki Takeda, Tokyo (JP); Prasad Reddy Kadiri, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/452,724

(22) Filed: Oct. 28, 2021

(65) Prior Publication Data

US 2022/0141861 A1    May 5, 2022

Related U.S. Application Data

(60) Provisional application No. 63/198,636, filed on Oct. 30, 2020.

(51) Int. Cl.
| | |
|---|---|
| *H04W 4/00* | (2018.01) |
| *H04L 1/00* | (2006.01) |
| *H04L 1/1812* | (2023.01) |
| *H04L 12/18* | (2006.01) |
| *H04W 72/1273* | (2023.01) |
| *H04W 72/23* | (2023.01) |

(52) U.S. Cl.
CPC ........... *H04W 72/23* (2023.01); *H04L 1/0008* (2013.01); *H04L 1/1812* (2013.01); *H04L 12/189* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 2019/0306841 | A1* | 10/2019 | Huang | H04L 5/0055 |
| 2020/0260424 | A1* | 8/2020 | Guo | H04L 1/0046 |
| 2020/0267511 | A1* | 8/2020 | Abdoli | H04W 76/11 |
| 2022/0132596 | A1* | 4/2022 | Jeon | H04W 74/008 |

OTHER PUBLICATIONS

International Search Report and Written Opinion—PCT/US2021/072135—ISA/EPO—Feb. 18, 2022.

(Continued)

*Primary Examiner* — Zewdu A Beyen
(74) *Attorney, Agent, or Firm* — Procopio, Cory, Hargreaves & Savitch LLP

(57) ABSTRACT

Various aspects of the present disclosure generally relate to wireless communication. In some aspects, a user equipment (UE) may receive, from a base station, radio resource control (RRC) signaling indicating a number of padding bits in multicast downlink control information (DCI). The UE may receive, from the base station, a multicast DCI message that includes a set of fields to indicate a set of communication parameters. The UE may interpret the multicast DCI message that indicates the set of communication parameters based at least in part on the number of padding bits indicated by the RRC signaling. Numerous other aspects are provided.

30 Claims, 13 Drawing Sheets

(56) References Cited

OTHER PUBLICATIONS

Moderator (CMCC): "Final Summary on mechanisms to support group scheduling for RRC_CONNECTED UEs for NR MBS", 3GPP Draft, 3GPP TSG RAN WG1 #106bis-e, R1-2110637, 3rd Generation Partnership Project (3GPP), Mobile Competence Centre, 650, Route Des Lucioles, F-06921 Sophia-Antipolis Cedex, France, vol. RAN WG1, No. e-Meeting, Oct 11, 2021-Oct. 19, 2021 Oct. 20, 2021 (Oct. 20, 2021), XP052062109, 152 Pages, Retrieved from the Internet: URL: https://ftp.3gpp.org/tsg_ran/WG1_RL1/TSGR1_106b-e/Docs/R1-2110637.zip R1-2110637.docs [Retrieved on Oct. 20, 2021] Sections 3 , 10, 3.7.
NTT Docomo, et al., "Discussion on Group Scheduling Mechanism for RRC_Connected UEs", 3GPP Draft, 3GPP TSG-RAN WG1 #105-e, R1-2105720, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021 (May 12, 2021), XP052011666, 9 Pages, Retrieved from the Internet: URL: https://ftp.3gpp.org/tsg_ran/WG1_RL1/TSGR1_105-e/Docs/R1-2105720.zip R1-2105720_final.doc [Retrieved on May 12, 2021] Section 2.2, Point "Option 2 [ .. ]", Subsection "DCI Size Alignment Procedure".
Samsung: "DL Control Enhancements for URLLC", 3GPP Draft, 3GPP TSG RAN WG1 #96, R1-1902296, 3rd Generation Partnership Project (3GPP), Mobile Competence Centre, 650, Route Des Lucioles, F-06921 Sophia-Antipolis Cedex, France, Feb. 15, 2019 (Feb. 15, 2019) XP051599990, 4 Pages, p. 2, par. "Proposal 1 [..]", p. 2, last par. , p. 3, par. 1.

* cited by examiner

MULTICAST SIGNALING WITH FORWARD COMPATIBILITY

CROSS-REFERENCE TO RELATED APPLICATION

This Patent Application claims priority to U.S. Provisional Patent Application No. 63/198,636, filed on Oct. 30, 2020, entitled "MULTICAST SIGNALING WITH FORWARD COMPATIBILITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multicast signaling with forward compatibility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, radio resource control (RRC) signaling indicating one or more parameters related to a size of multicast downlink control information (DCI); receiving, from the base station, a multicast DCI message that includes a set of fields to indicate a set of communication parameters; and interpreting the multicast DCI message that indicates the set of communication parameters based at least in part on a number of padding bits in the multicast DCI message, wherein the number of padding bits is based at least in part on the one or more parameters related to the size of the multicast DCI.

In some aspects, a method of wireless communication performed by a base station includes transmitting, to a UE, RRC signaling indicating one or more parameters related to a size of multicast DCI; and transmitting, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

In some aspects, a UE for wireless communication includes a memory and one or more processors, coupled to the memory, configured to: receive, from a base station, RRC signaling indicating one or more parameters related to a size of multicast DCI; receive, from the base station, a multicast DCI message that includes a set of fields to indicate a set of communication parameters; and interpret the multicast DCI message that indicates the set of communication parameters based at least in part on a number of padding bits in the multicast DCI message, wherein the number of padding bits is based at least in part on the one or more parameters related to the size of the multicast DCI.

In some aspects, a base station for wireless communication includes a memory and one or more processors, coupled to the memory, configured to: transmit, to a UE, RRC signaling indicating one or more parameters related to a size of multicast DCI; and transmit, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

In some aspects, a non-transitory computer-readable medium storing a set of instructions for wireless communication includes one or more instructions that, when executed by one or more processors of a UE, cause the UE to: receive, from a base station, RRC signaling indicating one or more parameters related to a size of multicast DCI; receive, from the base station, a multicast DCI message that includes a set of fields to indicate a set of communication parameters; and interpret the multicast DCI message that indicates the set of communication parameters based at least in part on a number of padding bits in the multicast DCI message, wherein the number of padding bits is based at least in part on the one or more parameters related to the size of the multicast DCI.

In some aspects, a non-transitory computer-readable medium storing a set of instructions for wireless communication includes one or more instructions that, when executed by one or more processors of a base station, cause the base station to: transmit, to a UE, RRC signaling indicating one or more parameters related to a size of multicast DCI; and transmit, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

In some aspects, an apparatus for wireless communication includes means for receiving, from a base station, RRC signaling indicating one or more parameters related to a size of multicast DCI; means for receiving, from the base station, a multicast DCI message that includes a set of fields to indicate a set of communication parameters; and means for interpreting the multicast DCI message that indicates the set of communication parameters based at least in part on a number of padding bits in the multicast DCI message, wherein the number of padding bits is based at least in part on the one or more parameters related to the size of the multicast DCI.

In some aspects, an apparatus for wireless communication includes means for transmitting, to a UE, RRC signaling indicating one or more parameters related to a size of multicast DCI; and means for transmitting, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
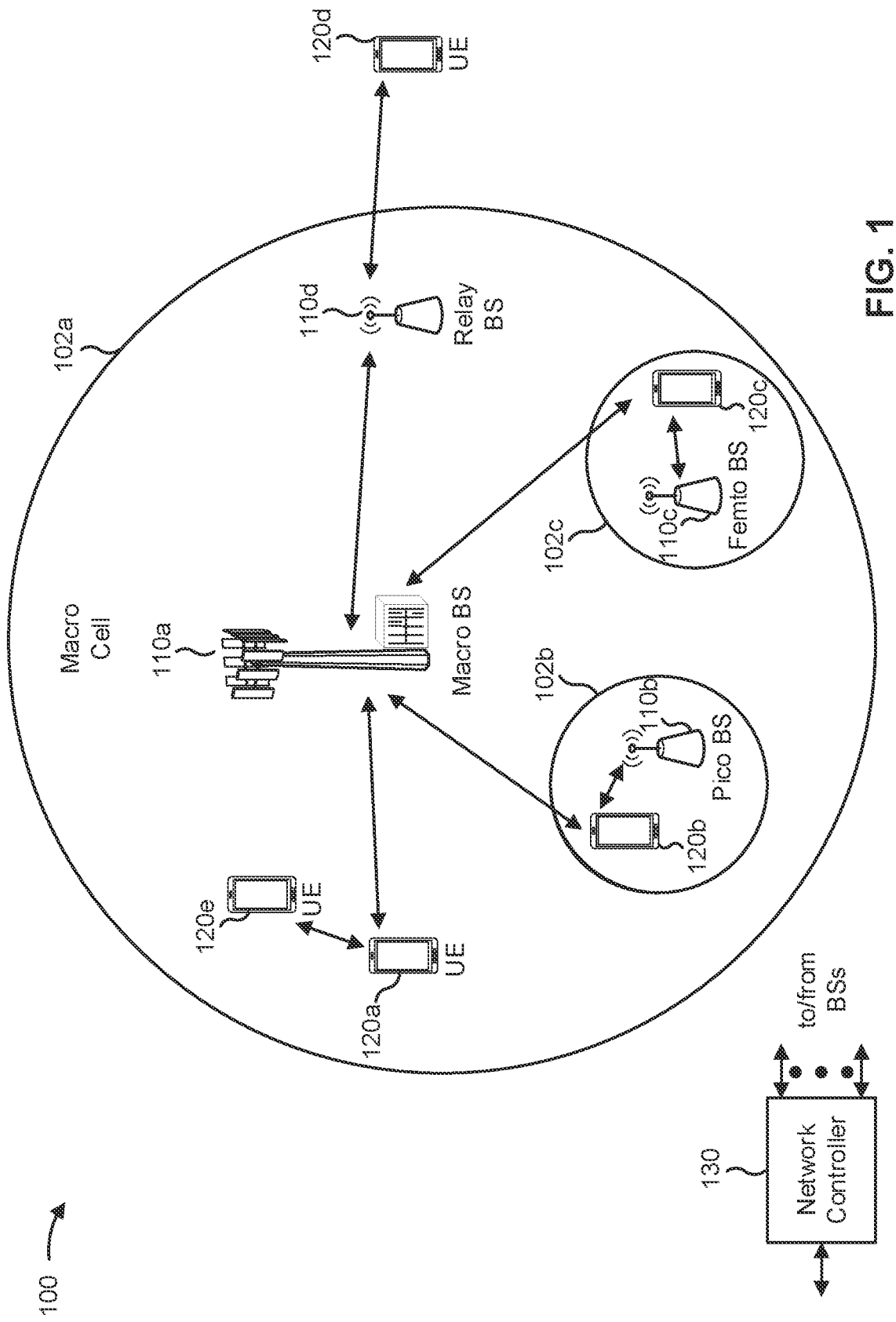
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FRE and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
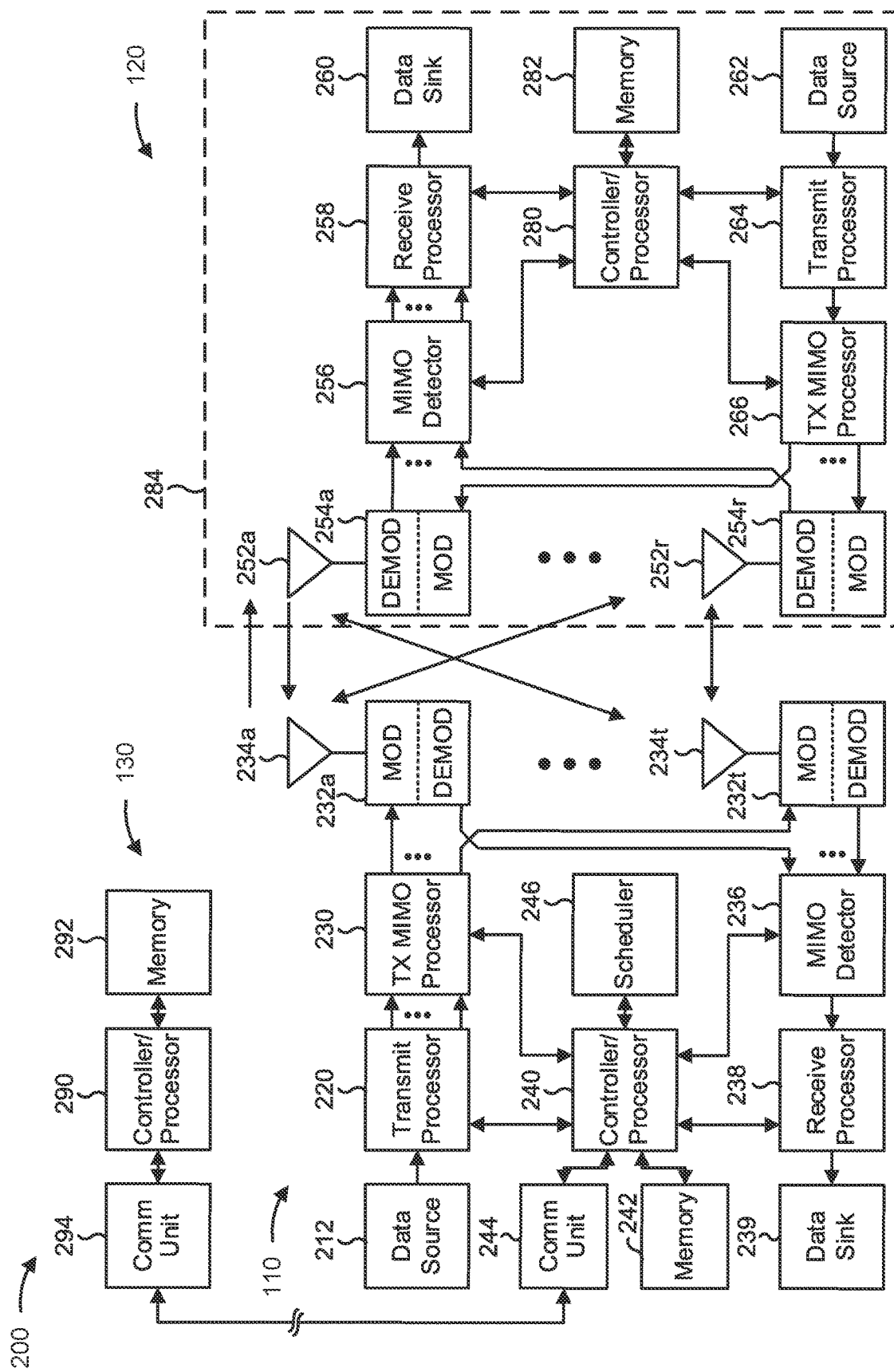
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4A-4F, FIG. 5, and/or FIG. 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4A-4F, FIG. 5, and/or FIG. 6).

Controller/processor 240 of base station 110, controller/processor 280 of UE 120, and/or any other component(s) of FIG. 2 may perform one or more techniques associated with multicast signaling with forward compatibility, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for receiving, from the base station 110, radio resource control (RRC) signaling indicating one or more parameters related to a size of multicast downlink control information (DCI), means for receiving, from the base station 110, a multicast DCI message that includes a set of fields to indicate a set of communication parameters, and/or means for interpreting the multicast DCI message that indicates the set of communication parameters based at least in part on a number of padding bits in the multicast DCI message, wherein the number of padding bits is based at least in part on the one or more parameters related to the size of the multicast DCI. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for ignoring the number of padding bits based at least in part on the RRC signaling having a unicast configuration.

In some aspects, the UE 120 includes means for deriving a UE-specific number of padding bits based at least in part on the RRC signaling having a broadcast configuration and/or means for ignoring the UE-specific number of padding bits.

In some aspects, the UE 120 includes means for determining that one or more features that enable a capability to decode a physical downlink shared channel (PDSCH) scheduled by the multicast DCI message are unsupported and/or means for determining whether to decode the PDSCH based at least in part on a value of one or more bits in the multicast DCI message that are associated with the one or more features that enable the capability to decode the PDSCH scheduled by the multicast DCI message.

In some aspects, the UE 120 includes means for refraining from decoding the PDSCH scheduled by the multicast DCI message based at least in part on the value of the one or more bits failing to satisfy a condition.

In some aspects, the UE 120 includes means for determining a hybrid automatic repeat request acknowledgement (HARQ-ACK) codebook to carry HARQ-ACK feedback for the PDSCH based at least in part on a downlink assignment index associated with the multicast DCI message and/or means for transmitting, to the base station 110, the HARQ-ACK codebook with HARQ-ACK feedback for the PDSCH scheduled by the multicast DCI message based at least in part on the HARQ-ACK codebook carrying HARQ-ACK feedback for at least one other PDSCH.

In some aspects, the UE 120 includes means for determining a HARQ-ACK codebook to carry HARQ-ACK feedback for the PDSCH based at least in part on a downlink assignment index associated with the multicast DCI message and/or means for refraining from transmitting the HARQ-ACK codebook based at least in part on the HARQ-ACK codebook carrying HARQ-ACK feedback only for the PDSCH scheduled by the multicast DCI message.

In some aspects, the UE 120 includes means for decoding the PDSCH scheduled by the multicast DCI message based at least in part on the value of the one or more bits satisfying a condition.

In some aspects, the base station 110 includes means for transmitting, to the UE 120, RRC signaling indicating one or more parameters related to a size of multicast DCI, and/or means for transmitting, to the UE 120, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for receiving, from the UE 120, a HARQ-ACK codebook that includes HARQ-ACK feedback for the PDSCH scheduled by the multicast DCI message.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
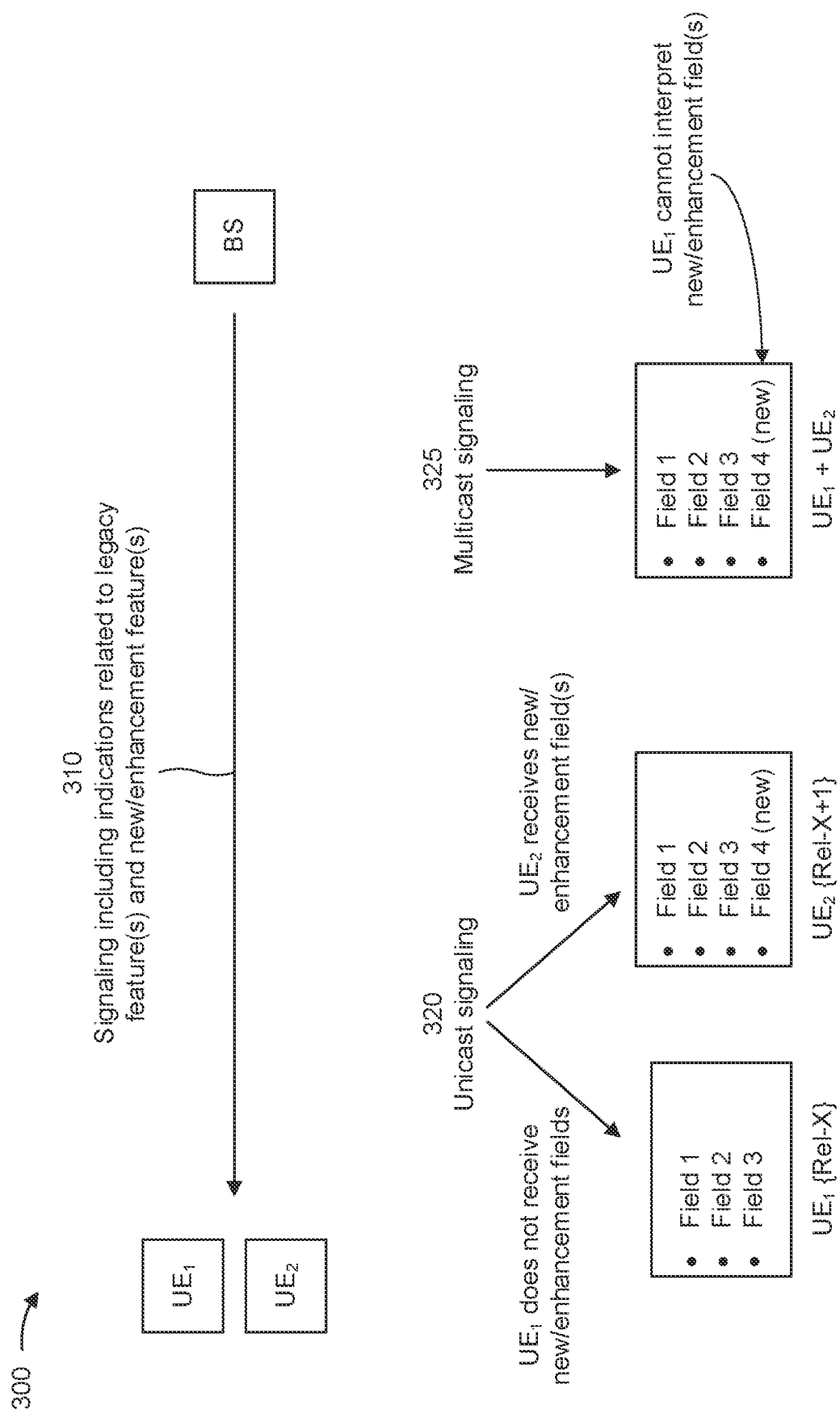
FIG. 3 is a diagram illustrating an example of signaling that includes indications related to legacy features and to new or enhancement features, in accordance with the present disclosure.

FIG. 3 is a diagram illustrating an example 300 of signaling that includes indications related to legacy features and to new or enhancement features, in accordance with the present disclosure.

In a wireless communication system, various devices generally communicate with one another according to various technical specifications. For example, IEEE 802.11 specifications specify various medium access control (MAC) layer and physical layer protocols to implement wireless local area network (WLAN) communication, and the Bluetooth Special Interest Group oversees the development of Bluetooth standards that are used to exchange data between fixed and mobile devices over short distances using ultra-high frequency radio waves in the industrial, scientific, and medial (ISM) radio bands. For cellular communication, which is constantly evolving with new features and new services, the Third Generation Partnership Project (3GPP) develops technical specifications that are then transposed into standards by regional standards setting organizations (SSOs) that form the 3GPP (e.g., the Alliance for Telecommunications Industry Solution (ATIS) in the United States and the European Telecommunications Standards Institute (ETSI) in Europe, among other examples).

In general, 3GPP specifications define end-to-end cellular systems, including UEs (or devices), radio access, core network, and/or service frameworks. For example, in a wireless network that is based on 3GPP technical specifications or standards (e.g., a cellular network), 3GPP introduces new features via releases, in a similar manner to different releases and/or versions of operating systems for smartphones or personal computers. 3GPP releases are typically staggered and work is done on multiple releases in parallel at different stages. When a 3GPP release is finalized, all new features are considered to be functionally frozen and ready to implement. Furthermore, each 3GPP release is self-contained, meaning that a cellular communication system can be built based on the frozen set of specifications in a particular release. Accordingly, releases do not merely contain newly implemented features, but instead are introduced in a highly iterative manner in which each release builds upon previous releases. For example, LTE technology was first introduced with 3GPP Release-8 and has continued to evolve through Release-16 and beyond, and Release-15 provided the first full set of NR standards (e.g., expanding beyond specifications to integrate non-standalone NR systems with previous generation LTE networks to cover standalone 5G with an NR system complemented by a next-generation core network). Accordingly, LTE and NR technologies may evolve in parallel in Release-16 and beyond as new features and technologies are introduced.

As a result, in a wireless network, challenges may arise with respect to signaling to enable new features because UEs that support the features in a particular release may not support features that are introduced in later releases, and different UEs that are associated with the same release may have different capabilities (e.g., may support and/or lack support for one or more features). For example, initial NR specifications were for unicast service only, but with the addition of multicast/broadcast services (e.g., in Release-17 and beyond), wireless networks may include one or more UEs that support features in a current release and one or more legacy UEs that support features in one or more prior releases. In unicast, the signaling issues may be relatively straightforward because a UE that supports features in a current release may not be configured with a feature that is introduced in a future release. Similarly, in unicast, a legacy UE that supports features in a prior release may not be configured with a feature that is introduced in a current release. However, for multicast/broadcast, the UEs that support the features in the current release and the legacy UE(s) that support the features in the prior release(s) may receive the same data (e.g., may need to read the same physical downlink control channel (PDCCH) and/or receive the same PDSCH).

For example, in FIG. 3, example 300 includes a base station in communication with a first UE (shown as UE1) and a second UE (shown as UE2) in a wireless network. The first UE may be a legacy UE that supports a first set of features associated with a previous release and/or version of a technical specification or standard, and the second UE may support the first set of features and a second set of features associated with a subsequent (e.g., current or intermediate) release and/or version of a technical specification or standard. Accordingly, as shown by reference number 310, the base station may transmit signaling that includes indications related to one or more legacy features introduced in the previous release supported by the first and second UE and indications related to one or more new or enhancement features introduced in the subsequent release supported only by the second UE. For example, the signaling may include RRC signaling, a MAC control element (MAC-CE) or MAC header, and/or DCI that indicates one or more communication parameters to enable a new feature or an enhancement feature. Accordingly, challenges related to forward compatibility may arise depending on whether the signaling is transmitted via unicast or multicast/broadcast, which may be referred to herein as "multicast" for simplicity.

For example, reference number 320 illustrates an example of unicast signaling, where the first UE and the second UE each receive signaling that includes one or more fields carrying indications related to a set of features that are supported by the respective UE. For example, as shown, the first UE supports release X (Rel-X), and the second UE supports Rel-X+1, where X is a positive integer (e.g., the first UE may be a Rel-16 UE and the second UE may be a Rel-17 UE). In this case, the first UE may receive unicast signaling that includes only indications related to the one or more legacy features associated with Rel-X (e.g., in fields 1-3 of a unicast DCI message), whereby the signaling transmitted to and received by the first UE does not include any indications related to the new or enhancement features introduced in Rel-X+1. However, because the second UE supports the new or enhancement features introduced in Rel-X+1, the unicast signaling received by the second UE includes the indications related to the legacy features associated with Rel-X (e.g., in fields 1-3 of a unicast DCI message) and also includes an indication related to a new or enhancement feature associated with Rel-X+1 (e.g., in field 4 of the unicast DCI message). In this way, when unicast signaling is used, each UE is able to decode and interpret the set of indications included in the unicast signaling.

However, as shown by reference number 325, both the first UE and the second UE receive the same signaling message(s) when multicast signaling is used. In this case, the multicast signaling includes indications related to a set of legacy features (e.g., in fields 1-3 of a multicast DCI message) and also includes an indication to enable a new or enhancement feature (e.g., in field 4). Accordingly, because the first UE supports only the set of legacy features and lacks support for the new or enhancement feature, the first UE cannot decode or otherwise interpret the multicast signaling (e.g., because the multicast signaling may have a larger bit size that is not expected by the first UE supports only the set of legacy features).

Some aspects described herein relate to techniques and apparatuses to enable multicast signaling with forward compatibility. For example, despite the possibility that one or more features introduced in a current (or future) release and/or version of a technical specification or standard may provide an enhancement on top of a previous (or current) release and/or version of the technical specification or standard, a legacy UE may still be able to decode the multicast user plane data (e.g., a PDSCH) without knowledge and/or support for the enhancement feature. For example, the new feature may be a DMRS bundling enhancement in which the first UE can assume a two (2) physical resource block (PRB) bundling and the second UE can assume a four (4) PRB bundling, a DCI power saving enhancement in which the first UE does not use the power saving feature and the second UE supports the power saving feature, a HARQ-ACK codebook enhancement in which the second UE may transmit HARQ-ACK feedback on an uplink using a smaller payload than the first UE, and/or a sounding reference signal (SRS) enhancement in which a broadcast PDSCH triggers an SRS transmission by the second UE but does not trigger an SRS transmission by the first UE, among other examples.

Accordingly, in some aspects described herein, a base station may transmit multicast signaling (e.g., a DCI, a MAC-CE, and/or an RRC configuration) common to a legacy UE and a later UE (e.g., a UE that supports a current release or version of a technical specification standard and/or an intermediate release or version between the current release or version and the release or version supported by the legacy UE). In some aspects, the multicast signaling may include one or more indications that are interpreted by the later UE and ignored by the legacy UE. For example, in some aspects, a base station may configure a number of padding bits in the multicast signaling (e.g., multicast DCI) that a UE supporting a current release or version of a technical specification is to ignore. Accordingly, the UE may become a legacy UE when a new or enhancement feature is introduced in a new release or version of the technical specification, and the padding bits may be used to indicate one or more fields that relate to communication parameters associated with the new or enhancement features to a new UE that supports such feature(s). In this way, the multicast signaling may be forward compatible, whereby the multicast signaling can be decoded by UEs that support different releases or versions of a technical specification or standard. Furthermore, the multicast signaling may be decodable by UEs with different capabilities within a release or version of a technical specification or standard (e.g., a feature in Rel-X supported by a first Rel-X UE but not supported by a second Rel-X UE).

As indicated above, FIG. 3 is provided as an example. Other examples may differ from what is described with regard to FIG. 3.

Figure 4A:
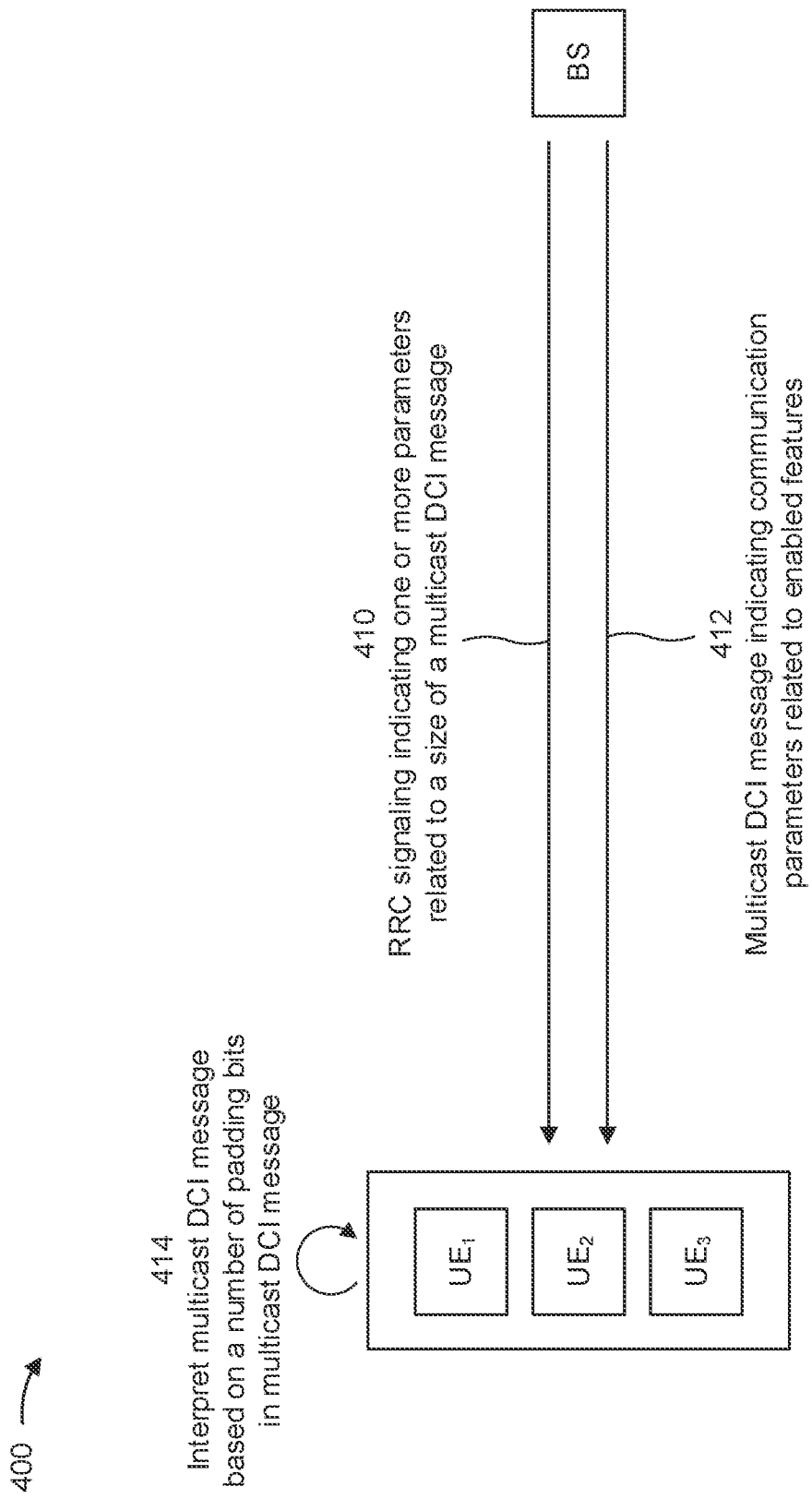
FIGS. 4A-4F are diagrams illustrating examples associated with multicast signaling with forward compatibility, in accordance with the present disclosure.

FIGS. 4A-4F are diagrams illustrating examples 400 associated with multicast signaling with forward compatibility, in accordance with the present disclosure. As shown in FIG. 4A, examples 400 includes communication between a base station (e.g., base station 110) and multiple UEs (e.g., UEs 120) that may support different sets of features and/or otherwise have different sets of capabilities. In some aspects, the base station and the UEs may communicate via a wireless access link, which may include an uplink and a downlink. Furthermore, as described herein, the base station and the UEs may communicate using a multicast configuration, whereby the multiple UEs receive the same control plane data (e.g., a multicast PDCCH) and/or the same user plane data (e.g., a multicast PDSCH scheduled by the multicast PDCCH).

In some aspects, as described above, the multiple UEs may support different sets of features and/or otherwise have different sets of capabilities. For example, in some aspects, the UEs may support different releases or versions of a technical specification or standard and/or different sets of features that relate to communication in a wireless network. For example, in some aspects, the UEs may include a first UE (shown as UE1) that supports a first (or baseline) release (e.g., Rel-X), a second UE (shown as UE2) that supports a subsequent release (e.g., Rel-X+1), and a third UE (shown as UE3) that supports a current release (e.g., Rel-X+2). Additionally, or alternatively, the UEs may have different intra-release capabilities, supporting different sets of features within the same release. For example, in some aspects described herein, the second UE and the third UE may support the same subsequent release (e.g., Rel-X+1), but the second UE has capabilities to support a feature set M and the third UE has capabilities to support a feature set N, where M and N may be distinct or overlapping.

In some aspects, as shown in FIG. 4A, and by reference number 410, the base station may transmit, and the UEs may each receive, RRC signaling to semi-statically indicate one or more parameters related to a size of a multicast DCI message targeting the multiple UEs. For example, in some aspects, the RRC signaling may include unicast RRC signaling that targets each UE individually (e.g., as described in further detail below with reference to FIG. 4B). Additionally, or alternatively, the RRC signaling may include broadcast or multicast RRC that targets the multiple UEs collectively (e.g., as described in further detail below with reference to FIG. 4C). In some aspects, the one or more parameters related to the size of the multicast DCI message may indicate a number of padding bits to be included in a multicast DCI message. Additionally, or alternatively, the one or more parameters may indicate the size of the multicast DCI message, which the targeted UEs can use to derive the number of padding bits to be included in the multicast DCI message. Furthermore, in some aspects, the RRC signaling may configure a location of the padding bits within the multicast DCI in addition to the number of padding bits (e.g., to differentiate intra-release capabilities to support different permutations of features, as described in further detail below with reference to FIG. 4D). Furthermore, in cases where support for one or more features indicated in the multicast DCI is needed to decoded a PDSCH scheduled by the multicast DCI, the base station may configure (e.g., via the RRC signaling) one or more fields in the multicast DCI to be check or validation fields, whereby a legacy UE may determine whether to decode the PDSCH and/or transmit acknowledgement/negative acknowledgement (ACK/NACK) feedback for the PDSCH based on a value of the one or more check or validation fields (e.g., as described in further detail below with reference to FIG. 4E and FIG. 4F).

As further shown in FIG. 4A, and by reference number 412, the base station may transmit, and the multiple UEs may each receive, a multicast DCI message that includes a set of fields to indicate a set of communication parameters related to a set of features that are enabled in the wireless network associated with the base station and the UEs. For example, in some aspects, the multicast DCI message may include one or more fields to indicate one or more communication parameters associated with one or more features enabled in a legacy release or version of a technical specification or standard (e.g., Rel-X) and may further include one or more fields to indicate one or more communication parameters associated with one or more features enabled in subsequent releases or versions of the technical specification or standard (e.g., Rel-X+1 and/or Rel-X+2, among other examples). Accordingly, as further shown in FIG. 4A, and by reference number 414, each UE that receives the multicast DCI message may interpret the DCI message based at least in part on a number of padding bits in the multicast DCI message, which each UE may determine based at least in part on the one or more parameters related to the size of the multicast DCI configured by the base station (e.g., in the RRC signaling). For example, each UE may determine the number and location of the padding bits in the multicast DCI message, which may depend on the particular features and/or capabilities supported by each respective UE. Accordingly, as described in further detail herein, each UE may ignore zero (0) or more bits that are configured as the padding bits in the multicast DCI.

Figure 4B:
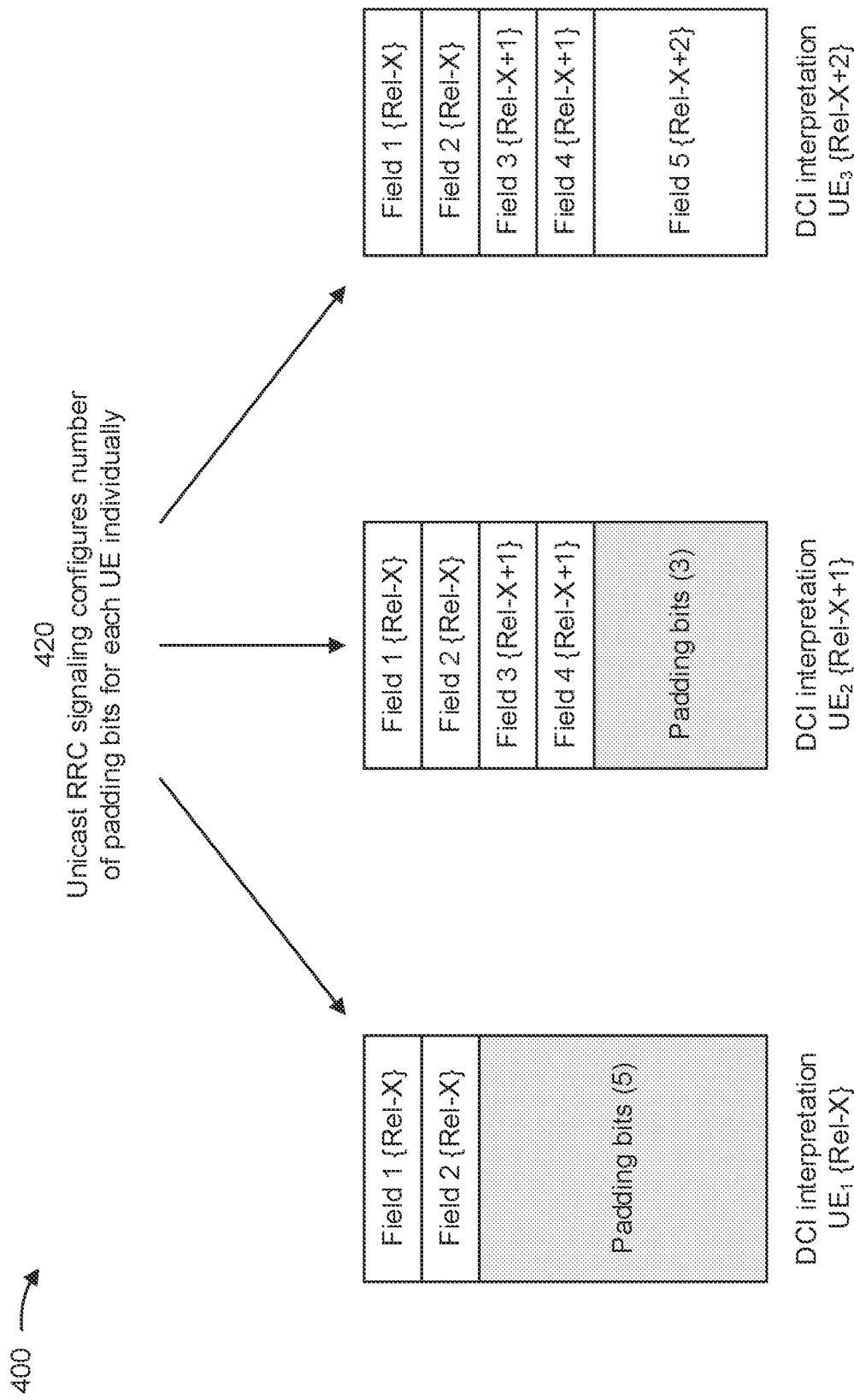

For example, referring to FIG. 4B, reference number 420 shows an example where unicast RRC signaling is used to configure the number of padding bits in the multicast DCI. In this case, the base station transmits separate unicast RRC signaling to each individual UE to configure the number of padding bits for each UE individually. In this case, the first UE may support a set of features that is enabled in Rel-X, the second UE may support a set of features that is enabled in Rel-X+1 (which may be iterative with respect to the features enabled in Rel-X), and the third UE may support a set of features that is enabled in Rel-X+2 (which may be iterative with respect to the features enabled in Rel-X and Rel-X+1). Accordingly, in cases where multicast/broadcast reception is configured by unicast RRC signaling, different UEs may receive different RRC configurations that indicate different numbers of padding bits based on the capabilities and/or release associated with the respective UEs.

For example, in FIG. 4B, the first UE that supports Rel-X may receive unicast signaling indicating that the multicast DCI message has five (5) padding bits located at the end of the multicast DCI message. Accordingly, the multicast DCI message may include a first field and a second field to indicate communication parameters associated with features that are enabled in Rel-X, and the first UE may apply the communication parameters indicated in the first field and the second field while ignoring the padding bits. Furthermore, for the second UE that supports Rel-X+1, the unicast signaling received by the second UE may indicate that the multicast DCI message has three (3) padding bits located at the end of the multicast DCI message. Accordingly, the multicast DCI message may include the first field and the second field to indicate the communication parameters associated with features that are enabled in Rel-X, and may further include a third field and a fourth field that each include one bit to indicate communication parameters associated with features that are enabled in Rel-X+1. In this case, the second UE may apply the communication parameters indicated in fields 1-4 while ignoring the three padding bits at the end of the multicast DCI message. Furthermore, for the third UE that supports Rel-X+2, the unicast signaling received by the third UE may indicate that the multicast DCI message has zero (0) padding bits. Accordingly, the multicast DCI message may include a fifth field with three (3) bits to indicate a communication parameter associated with a feature enabled in Rel-X+2 in addition to fields 1-4 used to indicate communication parameters associated with features enabled in Rel-X and Rel-X+1. In this way, the base station may transmit the same DCI message with the same bit size to each UE, except that one or more of the bits may be configured as padding bits to be ignored by UEs that lack support for the features associated with the corresponding fields.

Figure 4C:
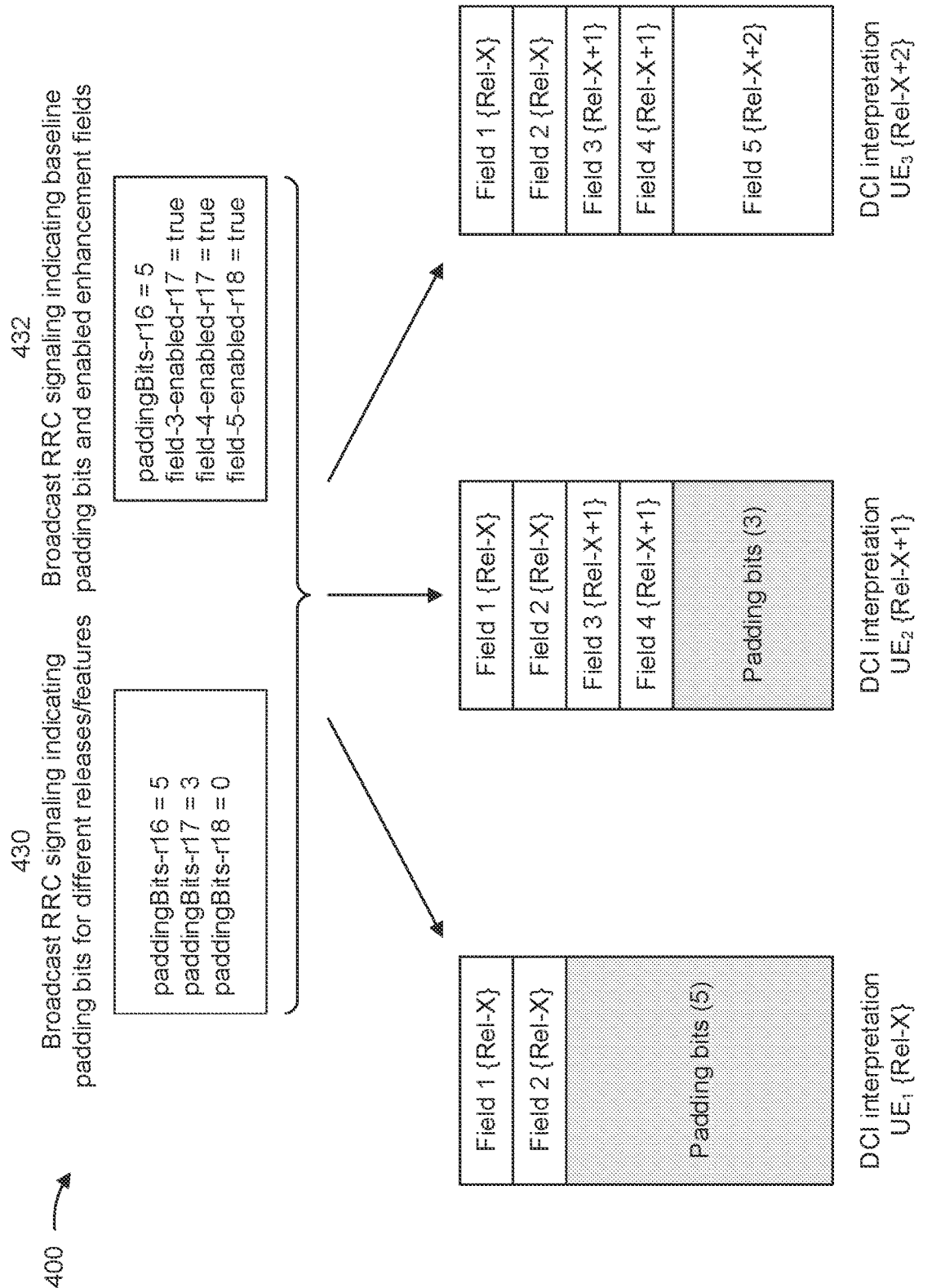

Additionally, or alternatively, referring to FIG. 4C, reference numbers 430 and 432 show examples where multicast/broadcast reception is configured by broadcast RRC signaling (e.g., in a system information block (SIB) and/or a multicast control channel (MCCH), among other examples). In this case, the base station transmits broadcast RRC signaling targeting all of the UEs that are configured for multicast/broadcast reception, and each UE may derive a UE-specific number of padding bits based at least in part on the broadcast RRC signaling. For example, in some aspects, the broadcast RRC signaling may indicate a common padding bit configuration for the multicast DCI message, and may further indicate one or more parameters to enable each individual UE to derive a UE-specific number of padding bits (e.g., zero or more padding bits) in the multicast DCI message that are to be ignored.

For example, as shown by reference number 430, the broadcast RRC signaling may indicate a number of padding bits for different releases and/or sets of features, among other examples. For example, in FIG. 4C, the broadcast RRC signaling may indicate that the multicast DCI message includes five padding bits for a UE supporting a baseline release (e.g., Rel-X, or Rel-16 in the example shown in FIG. 4C), zero padding bits for a UE supporting a current release (e.g., Rel-X+2, or Rel-18 in the example shown in FIG. 4C), and three padding bits for a UE supporting an intermediate release (e.g., Rel-X+1, or Rel-17 in the example shown in FIG. 4C).

Alternatively, as shown by reference number 432, the broadcast RRC signaling may indicate a baseline number of padding bits, which may be based on a minimum set of features supported by all of the UEs, and each UE may then reduce the baseline number of padding bits by zero or more based on one or more other fields that are indicated as enabled in the broadcast RRC signaling. For example, in FIG. 4C, the broadcast RRC signaling indicates five padding bits as a baseline for a minimum feature set that is associated with Rel-X (e.g., Rel-16 in the example of FIG. 4C). Furthermore, the broadcast RRC signaling indicates that field 3 and field 4 are enabled to indicate communication parameters introduced in Rel-X+1 (e.g., Rel-17 in the example of FIG. 4C) and that field 5 is enabled to indicate a communication parameter introduced in Rel-X+1 (e.g., Rel-18 in the example of FIG. 4C). In this case, the first UE that supports Rel-X may determine that the multicast DCI includes five padding bits (e.g., the baseline padding bits are reduced by zero) because the first UE does not support fields 3-5 that relate to features introduced in Rel-X+1 and Rel-X+2. Furthermore, the second UE that supports Rel-X+1 may determine that fields 3 and 4 that relate to features introduced in Rel-X+1 are enabled, and may therefore reduce the baseline number of padding bits based on the bit size of fields 3 and 4 (e.g., the second UE may determine that the multicast DCI includes three padding bits based on the five baseline padding bits and fields 3 and 4 each having a one-bit size). Furthermore, the third UE that supports Rel-X+1 and Rel-X+2 may determine that fields 3 and 4 that relate to features introduced in Rel-X+1 are enabled and that field 5 that relates to features introduced in Rel-X+2 is enabled, and may therefore reduce the baseline number of padding bits based on the bit size of fields 3-5 (e.g., the third UE may determine that the multicast DCI includes zero padding bits based on the five baseline padding bits, fields 3 and 4 each having a one-bit size, and field 5 having a three-bit size). Although the broadcast RRC signaling explicitly indicates the enabled field(s) in this example, it will be appreciated that the enabled fields may be implicitly indicated (e.g., by indicating that a given feature is enabled in broadcast/multicast signaling).

Figure 4D:
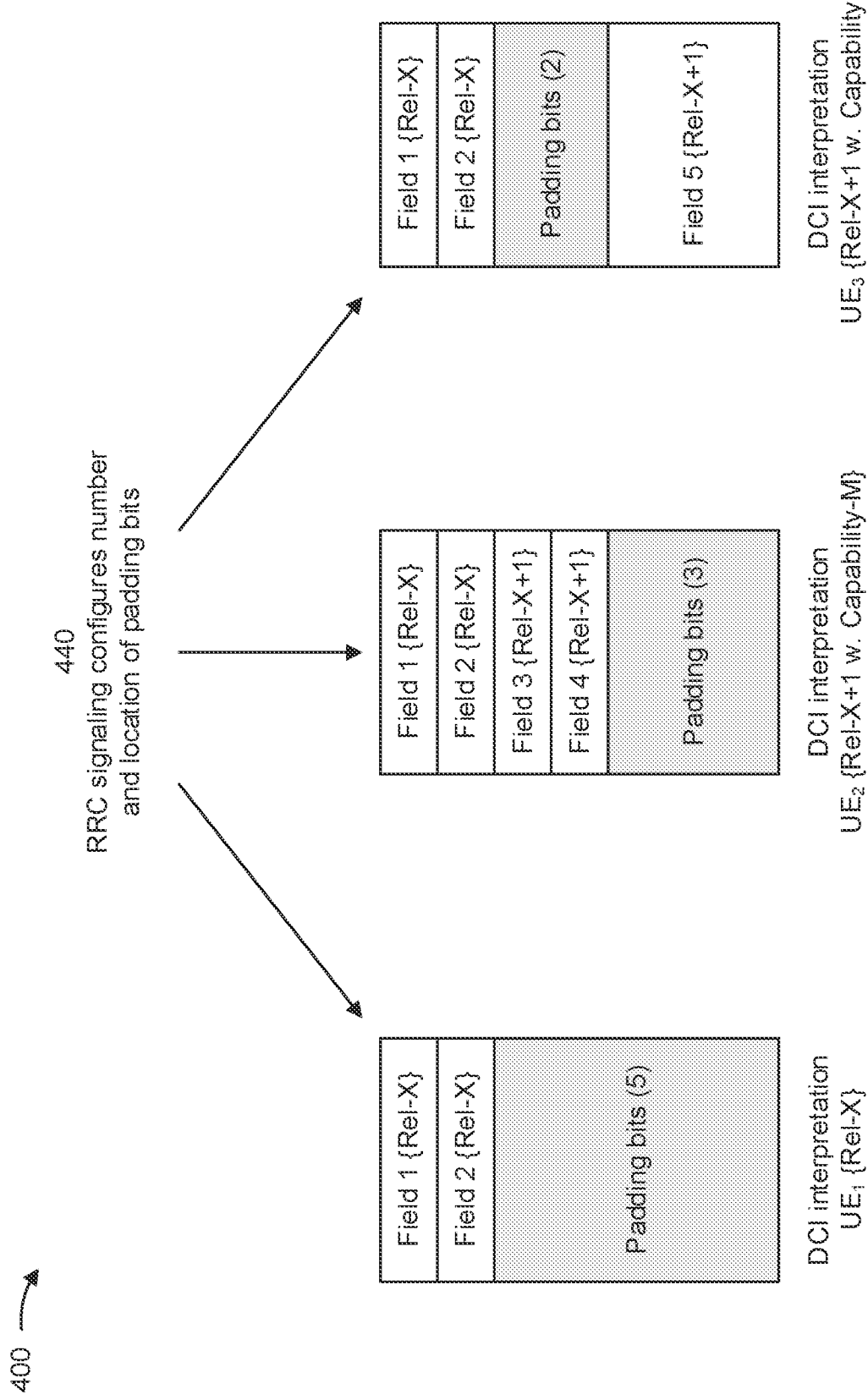

In some aspects, in the examples shown in FIGS. 4C and 4D, the padding bits are generally located at the end of the multicast DCI message (e.g., to reduce complexity associated with encoding and/or decoding the multicast DCI). However, as described above, different UEs that support the same release or version of a technical specification or standard may have non-uniform capabilities. For example, a first UE that supports Rel-X may have a capability to support a first set of features introduced in Rel-X and a second first UE that supports Rel-X may have a capability to support a second set of features introduced in Rel-X, where the features in the first set and the features in the second set may be disjoint or overlapping (or intersecting). For example, FIG. 4D illustrates an example where the first UE supports Rel-X, the second UE supports Rel-X+1 with capabilities to support a set of M features in Rel-X+1, and the third UE also supports Rel-X+1 but with capabilities to support a set of N features. In this case, fields 3-5 of the multicast DCI message may relate to features introduced in Rel-X+1, which may therefore be configured as padding bits for the legacy UE (UE1) that supports Rel-X. Furthermore, as shown by reference number 440 in FIG. 4D, the RRC signaling provided by the base station may indicate the location of the padding bits (e.g., via unicast or broadcast signaling) in addition to configuring the number of padding bits for each UE.

For example, in cases where fields 3-5 of the multicast DCI message relate to features introduced in Rel-X+1 and the second UE supports the features associated with the communication parameters indicated in fields 3 and 4 but lacks support for the feature associated with the communication parameter indicated in field 5, the RRC signaling may configure the padding bits to be located at the end of the multicast DCI message because field 5 is located at the end of the multicast DCI message. On the other hand, in cases where the third UE supports the feature associated with the communication parameter indicated in field 5 but lacks support for the features associated with the communication parameters indicated in fields 3 and 4, the RRC signaling may configure the padding bits to be located at the location corresponding to fields 3 and 4 for the third UE. In this way, the same multicast DCI message may be targeted to UEs associated with different releases or versions and to different intra-release UEs that have different capabilities and/or support for different feature sets by indicating the number and location of the padding bits for each UE.

In some aspects, the multicast DCI message may schedule a multicast PDSCH that includes user plane data targeted to the multiple UEs. In general, the configuration of the padding bits in the multicast DCI message may enable the multicast DCI message to be interpreted by legacy UEs (e.g., UEs that support an earlier release or version of a technical specification or standard relative to a current version) even though the multicast DCI message may include one or more fields to indicate one or more new or enhancement features that are unsupported by the legacy UEs. Accordingly, in some cases, the legacy UEs may still have a capability to decode the PDSCH even without knowledge and/or support for the new or enhancement feature(s). However, in some cases, one or more new or enhancement features may prevent a legacy UE from having a capability to decode the PDSCH (e.g., an "outer code" introduced at a physical layer in Rel-X+1 may prevent UEs associated with Rel-X or earlier from decoding the PDSCH). In other words, the new or enhancement feature(s) may enable a capability to decode the PDSCH scheduled by the multicast DCI, such that legacy UEs that lack support for the new or enhancement feature(s) may be unable to decode the PDSCH. Accordingly, in some aspects, one or more bits in the multicast DCI message may be configured as check bits or validation bits, whereby a legacy UE may determine whether to decode the PDSCH scheduled by the multicast DCI message based at least in part on a value of the one or more check bits or validation bits.

Figure 4E:
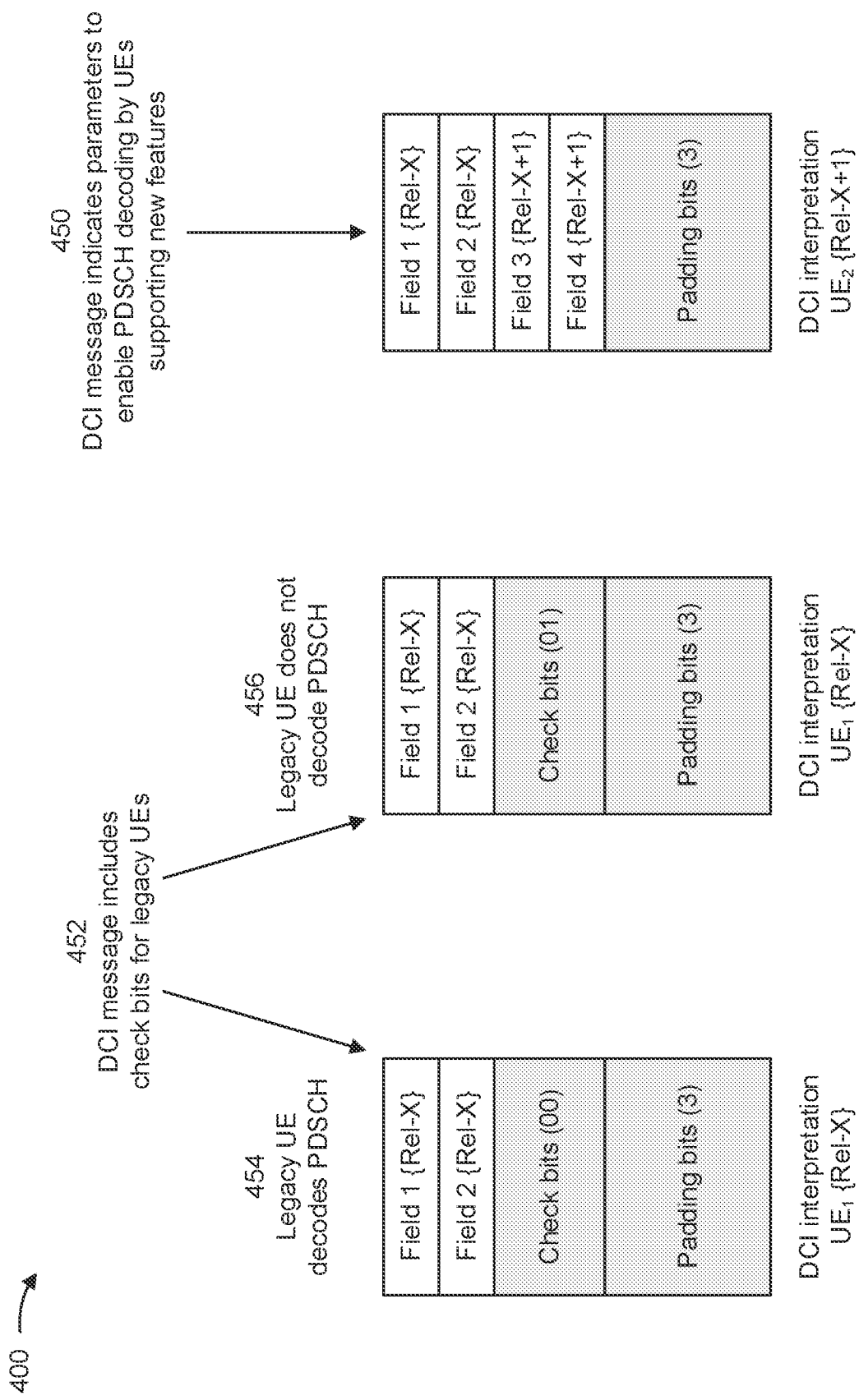

For example, as shown in FIG. 4E, and by reference number 450, the multicast DCI message may include fields 1 and 2 that are associated with Rel-X, and the multicast DCI message may further include fields 3 and 4 that are associated with Rel-X+1. Furthermore, in some aspects, the multicast DCI message may be configured with one or more padding bits that are used to indicate one or more communication parameters associated with a release later than Rel-X+1 to one or more UEs associated with the later release. In this example, fields 3 and 4 may enable a capability to decode the PDSCH scheduled by the multicast DCI message. Accordingly, because the second UE supports Rel-X+1, the second UE applies the communication parameters indicated in fields 3 and 4 to decode the PDSCH. Furthermore, as shown by reference number 452, the multicast DCI message configures the bits corresponding to fields 3 and 4 as check bits or validation bits for the legacy UE associated with Rel-X (or earlier). In this case, the legacy UE may determine the value of the check bits, and the legacy UE may determine whether to decode the PDSCH based on the value of the check bits. For example, the legacy UE may compare the value of the check bits to a predetermined value, and may decode the PDSCH if the value of the check bits satisfies a condition and may otherwise refrain from decoding the PDSCH if the value of the check bits fails to satisfy the condition (or vice versa). For example, as shown by reference number 454, the legacy UE may decode the PDSCH if the check bits have a value (e.g., '00') that indicates that the communication parameters that are necessary to decode the PDSCH are not enabled. Alternatively, as shown by reference number 456, the legacy UE may refrain from decoding the PDSCH if the check bits have any other value that indicates that the communication parameters that are necessary to decode the PDSCH are enabled (e.g., '01', '10', or '11'). In this way, the legacy UE may avoid unnecessarily attempting to decode a PDSCH that is not decodable by the legacy UE due to a lack of support for the feature(s) enabling the PDSCH to be decoded.

Figure 4F:
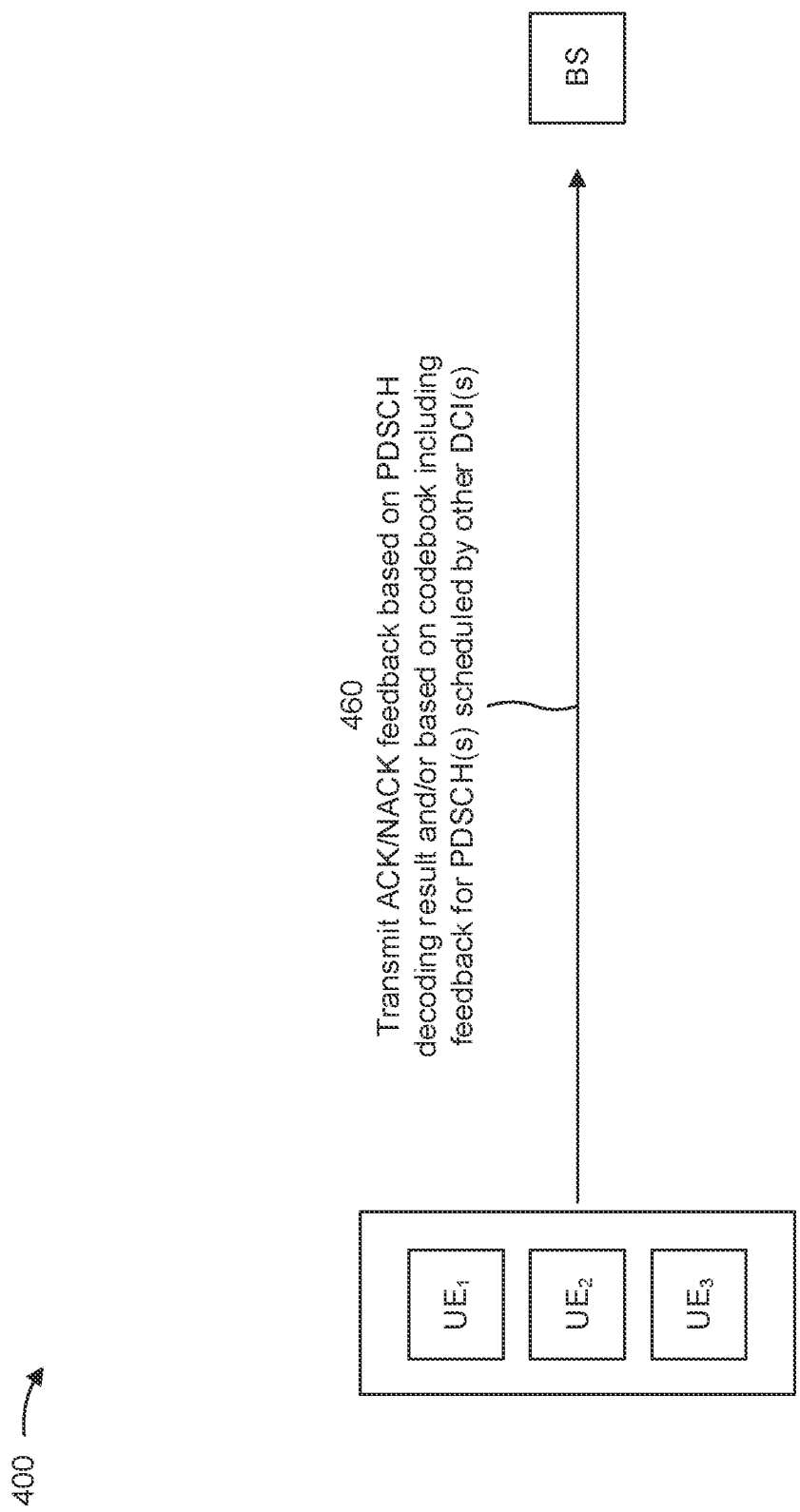

Furthermore, as shown in FIG. 4F, and by reference number 460, one or more of the UEs that receive the multicast DCI message may transmit, to the base station, ACK/NACK feedback for the PDSCH scheduled by the multicast DCI message. For example, a UE may generally attempt to receive and decode the PDSCH based on the PDSCH not requiring support for one or more new or enhancement features indicated in the multicast DCI message, based on the UE having support for one or more new or enhancement features that enable a capability to decode the PDSCH scheduled by the multicast DCI message, and/or based on the multicast DCI message indicating in one or more check bits that the one or more new or enhancement features that enable the capability to decode the PDSCH are not enabled for that PDSCH. In such cases, the UE may attempt to receive and decode the PDSCH, and may transmit ACK/NACK feedback based on the PDSCH decoding result (e.g., may indicate an ACK if the PDSCH is successfully decoded, or may indicate a NACK if the PDSCH is not received and/or decoded successfully).

Alternatively, in the case of a legacy UE that refrains from decoding the PDSCH scheduled by the multicast DCI message due to a lack of support for new or enhancement features that are enabled and needed to decode the PDSCH, the legacy UE may determine whether to transmit the ACK/NACK feedback or refrain from transmitting the ACK/NACK feedback. For example, in some aspects, the legacy UE may process a downlink assignment index (DAI) (e.g., a counter DAI) to determine a HARQ-ACK codebook associated with the PDSCH, and may generate an ACK or a NACK (e.g., according to rules that are predefined in a technical specification or standard) for the PDSCH if the multicast DCI message is not the only DCI that schedules a PDSCH associated with the same HARQ-ACK codebook. For example, in some aspects, the legacy UE may generate an ACK to prevent the base station from unnecessarily attempting to retransmit the PDSCH that cannot be decoded, or the legacy UE may generate a NACK to indicate that the PDSCH cannot be decoded. In either case, the ACK/NACK feedback for the PDSCH that cannot be decoded may be concatenated with the ACK/NACK feedback associated with the other PDSCH(s) that have ACK/NACK feedback in the same HARQ-ACK codebook. Otherwise, if the multicast DCI message scheduling the PDSCH that cannot be decoded is the only DCI that schedules a PDSCH in the HARQ-ACK codebook associated with the DAI, the UE may refrain from transmitting the ACK/NACK feedback for the undecodable PDSCH.

As indicated above, FIGS. 4A-4F are provided as examples. Other examples may differ from what is described with regard to FIGS. 4A-4F.

Figure 5:
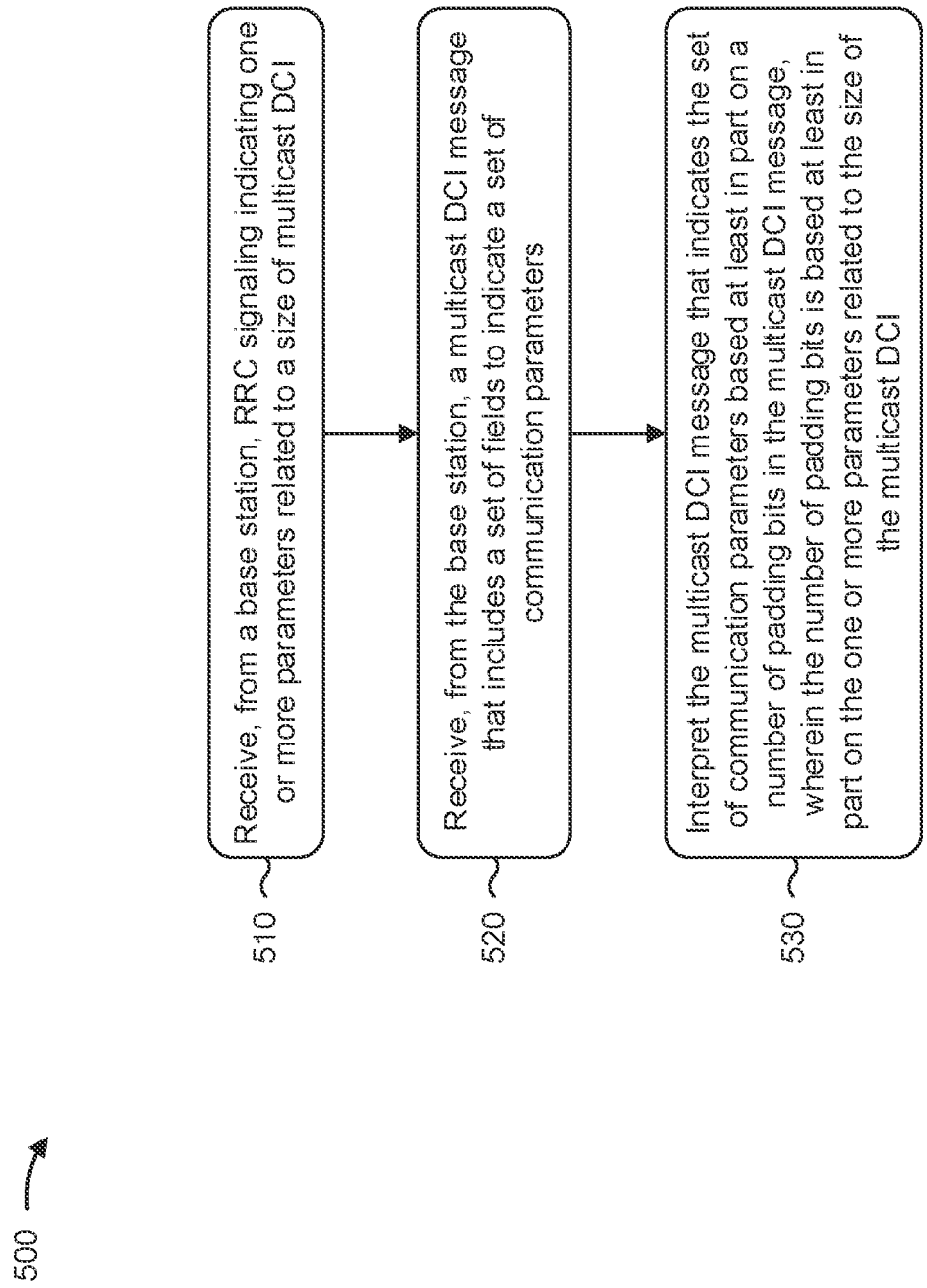
FIGS. 5-6 are diagrams illustrating example processes associated with multicast signaling with forward compatibility, in accordance with the present disclosure.

FIG. 5 is a diagram illustrating an example process 500 performed, for example, by a UE, in accordance with the present disclosure. Example process 500 is an example where the UE (e.g., UE 120) performs operations associated with multicast signaling with forward compatibility.

As shown in FIG. 5, in some aspects, process 500 may include receiving, from a base station, RRC signaling indicating one or more parameters related to a size of multicast DCI (block 510). For example, the UE (e.g., using reception component 702, depicted in FIG. 7) may receive, from a base station, RRC signaling indicating one or more parameters related to a size of multicast DCI, as described above.

As further shown in FIG. 5, in some aspects, process 500 may include receiving, from the base station, a multicast DCI message that includes a set of fields to indicate a set of communication parameters (block 520). For example, the UE (e.g., using reception component 702, depicted in FIG. 7) may receive, from the base station, a multicast DCI message that includes a set of fields to indicate a set of communication parameters, as described above.

As further shown in FIG. 5, in some aspects, process 500 may include interpreting the multicast DCI message that indicates the set of communication parameters based at least in part on a number of padding bits in the multicast DCI message, wherein the number of padding bits is based at least in part on the one or more parameters related to the size of the multicast DCI (block 530). For example, the UE (e.g., using interpretation component 708, depicted in FIG. 7) may interpret the multicast DCI message that indicates the set of communication parameters based at least in part on a number of padding bits in the multicast DCI message, wherein the number of padding bits is based at least in part on the one or more parameters related to the size of the multicast DCI, as described above.

Process 500 may include additional aspects, such as any single aspect or any combination of aspects described below and/or in connection with one or more other processes described elsewhere herein.

In a first aspect, interpreting the multicast DCI message includes ignoring the number of padding bits based at least in part on the RRC signaling having a unicast configuration.

In a second aspect, alone or in combination with the first aspect, the number of padding bits is based at least in part on one or more features supported by the UE based at least in part on the RRC signaling having a unicast configuration.

In a third aspect, alone or in combination with one or more of the first and second aspects, interpreting the multicast DCI message includes deriving a UE-specific number of padding bits based at least in part on the RRC signaling having a broadcast configuration, and ignoring the UE-specific number of padding bits.

In a fourth aspect, alone or in combination with one or more of the first through third aspects, process 500 includes the RRC signaling indicates different numbers of padding bits that are based at least in part on features supported by different UEs, and deriving the UE-specific number of padding bits includes determining, among the different numbers of padding bits, the UE-specific number of padding bits based at least in part on one or more features supported by the UE.

In a fifth aspect, alone or in combination with one or more of the first through fourth aspects, process 500 includes the RRC signaling indicates a baseline number of padding bits based at least in part on a minimum set of features and further indicates a set of fields enabled in the multicast DCI that are related to enhanced features, and deriving the UE-specific number of padding bits includes reducing the baseline number of padding bits to determine the UE-specific number of padding bits based at least in part on a bit size associated with one or more of the set of fields that are related to enhanced features supported by the UE.

In a sixth aspect, alone or in combination with one or more of the first through fifth aspects, the padding bits are located at an end of the multicast DCI message.

In a seventh aspect, alone or in combination with one or more of the first through sixth aspects, the RRC signaling further indicates a location of the padding bits in the multicast DCI message based at least in part on a set of features supported by the UE.

In an eighth aspect, alone or in combination with one or more of the first through seventh aspects, the number of padding bits is zero or more.

In a ninth aspect, alone or in combination with one or more of the first through eighth aspects, interpreting the multicast DCI message includes determining that one or more features that enable a capability to decode a PDSCH scheduled by the multicast DCI message are unsupported, and determining whether to decode the PDSCH based at least in part on a value of one or more bits in the multicast DCI message that are associated with the one or more features that enable the capability to decode the PDSCH scheduled by the multicast DCI message.

In a tenth aspect, alone or in combination with one or more of the first through ninth aspects, process 500 includes refraining from decoding the PDSCH scheduled by the multicast DCI message based at least in part on the value of the one or more bits failing to satisfy a condition.

In an eleventh aspect, alone or in combination with one or more of the first through tenth aspects, process 500 includes determining a HARQ-ACK codebook to carry HARQ-ACK feedback for the PDSCH based at least in part on a downlink assignment index associated with the multicast DCI message, and transmitting, to the base station, the HARQ-ACK codebook with HARQ-ACK feedback for the PDSCH scheduled by the multicast DCI message based at least in part on the HARQ-ACK codebook carrying HARQ-ACK feedback for at least one other PDSCH.

In a twelfth aspect, alone or in combination with one or more of the first through eleventh aspects, process 500 includes determining a HARQ-ACK codebook to carry HARQ-ACK feedback for the PDSCH based at least in part on a downlink assignment index associated with the multicast DCI message, and refraining from transmitting the HARQ-ACK codebook based at least in part on the HARQ-ACK codebook carrying HARQ-ACK feedback only for the PDSCH scheduled by the multicast DCI message.

In a thirteenth aspect, alone or in combination with one or more of the first through twelfth aspects, process 500 includes decoding the PDSCH scheduled by the multicast DCI message based at least in part on the value of the one or more bits satisfying a condition.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
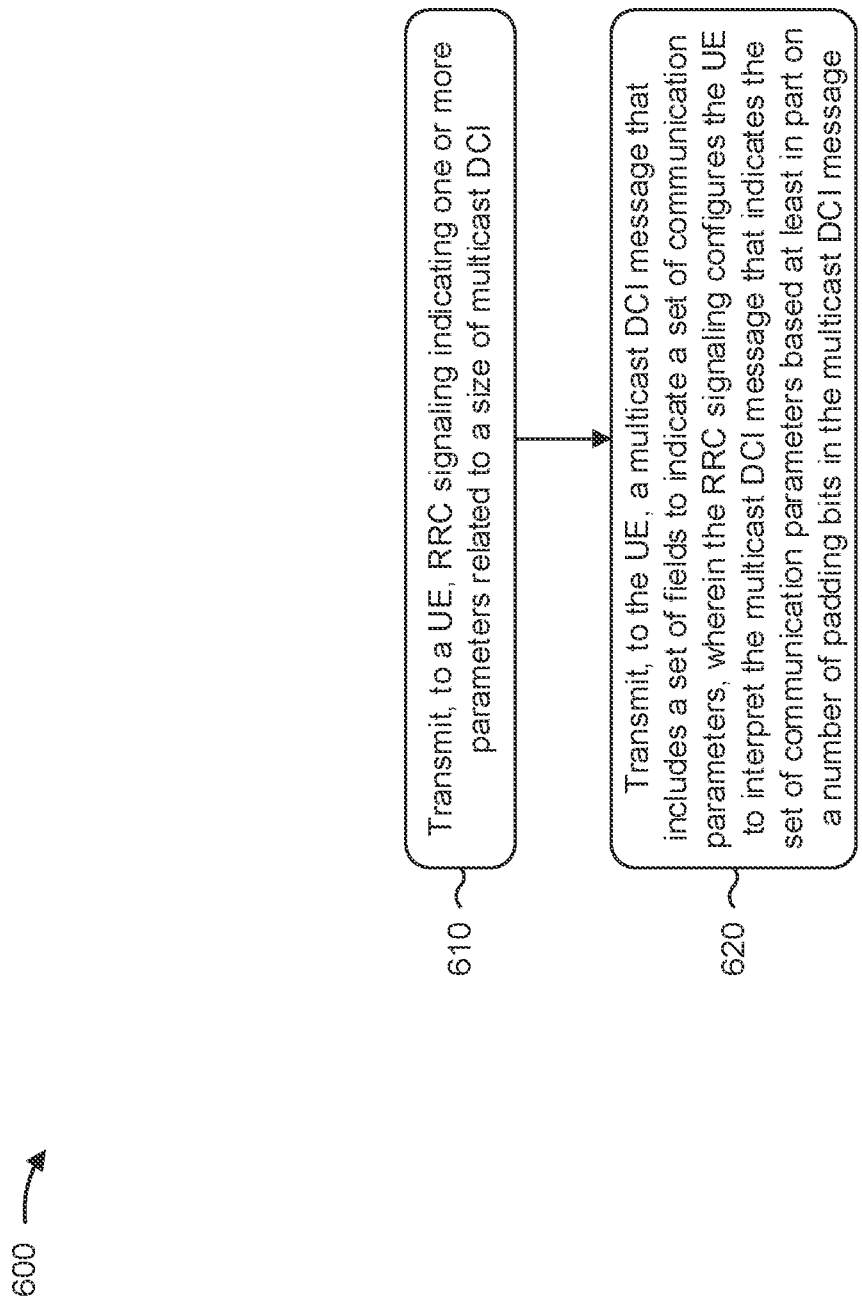

FIG. 6 is a diagram illustrating an example process 600 performed, for example, by a base station, in accordance with the present disclosure. Example process 600 is an example where the base station (e.g., base station 110) performs operations associated with multicast signaling with forward compatibility.

As shown in FIG. 6, in some aspects, process 600 may include transmitting, to a UE, RRC signaling indicating one or more parameters related to a size of multicast DCI (block 610). For example, the base station (e.g., using transmission component 804, depicted in FIG. 8) may transmit, to a UE, RRC signaling indicating one or more parameters related to a size of multicast DCI, as described above.

As further shown in FIG. 6, in some aspects, process 600 may include transmitting, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message (block 620). For example, the base station (e.g., using transmission component 804, depicted in FIG. 8) may transmit, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message, as described above.

Process 600 may include additional aspects, such as any single aspect or any combination of aspects described below and/or in connection with one or more other processes described elsewhere herein.

In a first aspect, the RRC signaling configures the UE to ignore the number of padding bits based at least in part on the RRC signaling having a unicast configuration.

In a second aspect, alone or in combination with the first aspect, the number of padding bits is based at least in part on one or more features supported by the UE based at least in part on the RRC signaling having a unicast configuration.

In a third aspect, alone or in combination with one or more of the first and second aspects, the RRC signaling configures the UE to derive a UE-specific number of padding bits and to ignore the UE-specific number of padding bits based at least in part on the RRC signaling having a broadcast configuration.

In a fourth aspect, alone or in combination with one or more of the first through third aspects, the RRC signaling indicates different numbers of padding bits that are based at least in part on features supported by different UEs.

In a fifth aspect, alone or in combination with one or more of the first through fourth aspects, the RRC signaling indicates a baseline number of padding bits based at least in part on a minimum set of features and further indicates a set of fields enabled in the multicast DCI that are related to enhanced features.

In a sixth aspect, alone or in combination with one or more of the first through fifth aspects, the padding bits are located at an end of the multicast DCI message.

In a seventh aspect, alone or in combination with one or more of the first through sixth aspects, the RRC signaling further indicates a location of the padding bits in the multicast DCI message based at least in part on a set of features supported by the UE.

In an eighth aspect, alone or in combination with one or more of the first through seventh aspects, the number of padding bits is zero or more.

In a ninth aspect, alone or in combination with one or more of the first through eighth aspects, one or more bits in the multicast DCI message have a value associated with one or more features that enable a capability to decode a PDSCH scheduled by the multicast DCI message.

In a tenth aspect, alone or in combination with one or more of the first through ninth aspects, process 600 includes receiving, from the UE, a HARQ-ACK codebook that includes HARQ-ACK feedback for the PDSCH scheduled by the multicast DCI message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
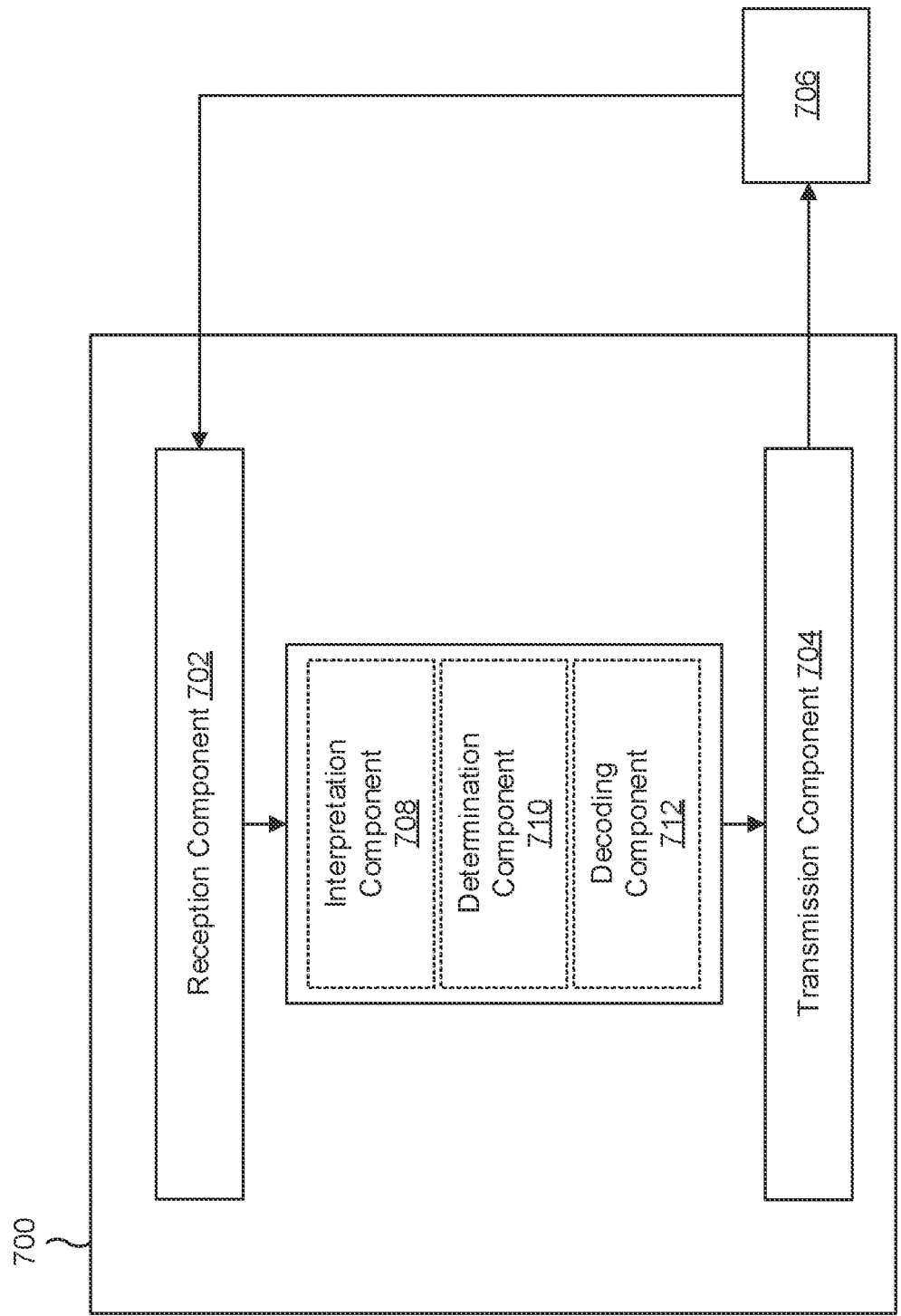
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a interpretation component 708, a determination component 710, or a decoding component 712, among other examples.

In some aspects, the apparatus 700 may be configured to perform one or more operations described herein in connection with FIGS. 4A-4F. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a base station, RRC signaling indicating one or more parameters related to a size of multicast DCI. The reception component 702 may receive, from the base station, a multicast DCI message that includes a set of fields to indicate a set of communication parameters. The interpretation component 708 may interpret the multicast DCI message that indicates the set of communication parameters based at least in part on a number of padding bits in the multicast DCI message, wherein the number of padding bits is based at least in part on the one or more parameters related to the size of the multicast DCI. In some aspects, the interpretation component 708 may include one or more antennas, a demodulator, a MIMO detector, a receive processor, a controller/processor, a memory, or a combination thereof, of the UE described above in connection with FIG. 2.

The interpretation component 708 may ignore the number of padding bits based at least in part on the RRC signaling having a unicast configuration.

The interpretation component 708 may derive a UE-specific number of padding bits based at least in part on the RRC signaling having a broadcast configuration and ignore the UE-specific number of padding bits.

The interpretation component 708 may determine, among different numbers of padding bits indicated in the RRC signaling, the UE-specific number of padding bits based at least in part on one or more features supported by the UE.

The interpretation component 708 may reduce a baseline number of padding bits indicated in the RRC signaling to determine the UE-specific number of padding bits based at least in part on a bit size associated with one or more of the set of fields that are related to enhanced features supported by the UE.

The interpretation component 708 may determine that one or more features that enable a capability to decode a PDSCH scheduled by the multicast DCI message are unsupported and determine whether to decode the PDSCH based at least in part on a value of one or more bits in the multicast DCI message that are associated with the one or more features that enable the capability to decode the PDSCH scheduled by the multicast DCI message.

The decoding component 712 may refrain from decoding the PDSCH scheduled by the multicast DCI message based at least in part on the value of the one or more bits failing to satisfy a condition. In some aspects, the decoding component 712 may include one or more antennas, a demodulator, a MIMO detector, a receive processor, a controller/processor, a memory, or a combination thereof, of the UE described above in connection with FIG. 2.

The determination component 710 may determine a HARQ-ACK codebook to carry HARQ-ACK feedback for the PDSCH based at least in part on a downlink assignment index associated with the multicast DCI message. In some aspects, the determination component 710 may include a controller/processor, a memory, or a combination thereof, of the UE described above in connection with FIG. 2. The transmission component 704 may transmit, to the base station, the HARQ-ACK codebook with HARQ-ACK feedback for the PDSCH scheduled by the multicast DCI message based at least in part on the HARQ-ACK codebook carrying HARQ-ACK feedback for at least one other PDSCH.

The determination component 710 may determine a HARQ-ACK codebook to carry HARQ-ACK feedback for the PDSCH based at least in part on a downlink assignment index associated with the multicast DCI message.

The transmission component 704 may refrain from transmitting the HARQ-ACK codebook based at least in part on the HARQ-ACK codebook carrying HARQ-ACK feedback only for the PDSCH scheduled by the multicast DCI message.

The decoding component 712 may decode the PDSCH scheduled by the multicast DCI message based at least in part on the value of the one or more bits satisfying a condition.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
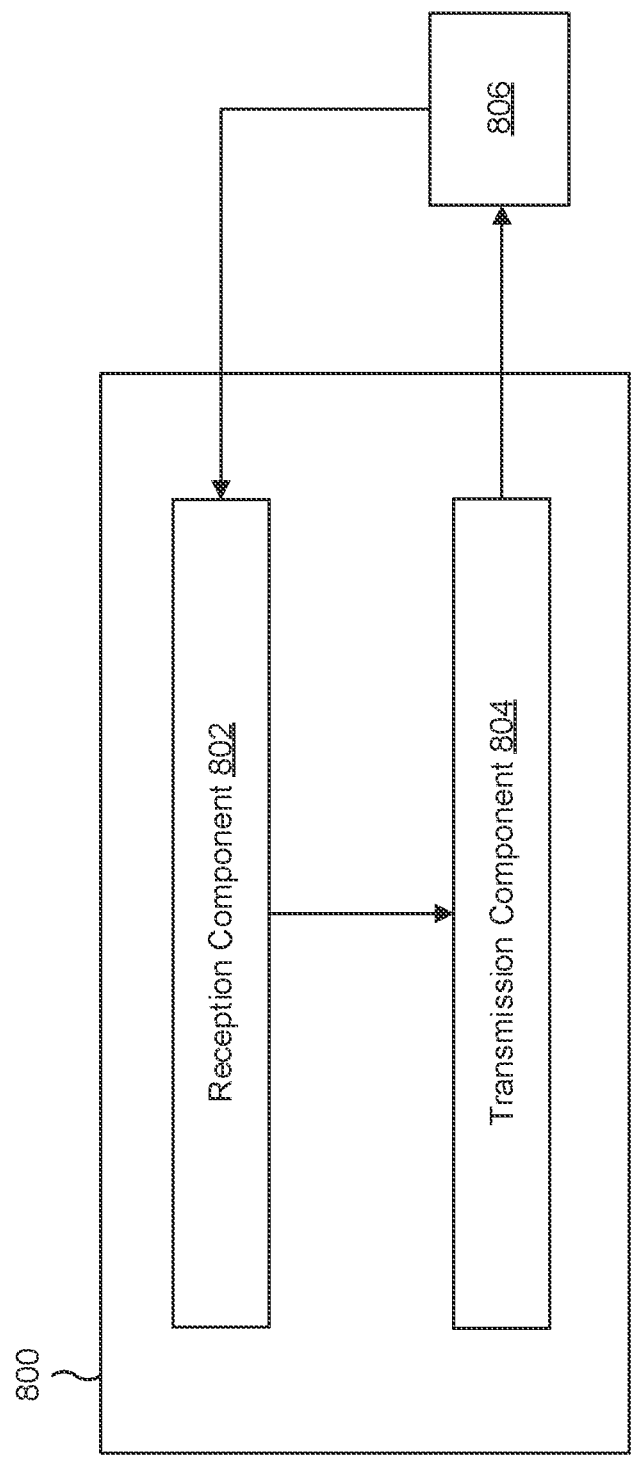

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 4A-4F. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, RRC signaling indicating one or more parameters related to a size of multicast DCI. The transmission component 804 may transmit, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

The reception component 802 may receive, from the UE, a HARQ-ACK codebook that includes HARQ-ACK feedback for the PDSCH scheduled by the multicast DCI message.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving, from a base station, RRC signaling indicating one or more parameters related to a size of multicast DCI; receiving, from the base station, a multicast DCI message that includes a set of fields to indicate a set of communication parameters; and interpreting the multicast DCI message that indicates the set of communication parameters based at least in part on a number of padding bits in the multicast DCI message, wherein the number of padding bits is based at least in part on the one or more parameters related to the size of the multicast DCI.

Aspect 2: The method of Aspect 1, wherein interpreting the multicast DCI message includes: ignoring the number of padding bits based at least in part on the RRC signaling having a unicast configuration.

Aspect 3: The method of any of Aspects 1-2, wherein the number of padding bits is based at least in part on one or more features supported by the UE based at least in part on the RRC signaling having a unicast configuration.

Aspect 4: The method of Aspect 1, wherein interpreting the multicast DCI message includes: deriving a UE-specific number of padding bits based at least in part on the RRC signaling having a broadcast configuration; and ignoring the UE-specific number of padding bits.

Aspect 5: The method of Aspect 4, wherein: the RRC signaling indicates different numbers of padding bits that are based at least in part on features supported by different UEs, and deriving the UE-specific number of padding bits includes determining, among the different numbers of padding bits, the UE-specific number of padding bits based at least in part on one or more features supported by the UE.

Aspect 6: The method of Aspect 4, wherein: the RRC signaling indicates a baseline number of padding bits based at least in part on a minimum set of features and further indicates a set of fields enabled in the multicast DCI that are related to enhanced features, and deriving the UE-specific number of padding bits includes reducing the baseline number of padding bits to determine the UE-specific number of padding bits based at least in part on a bit size associated with one or more of the set of fields that are related to enhanced features supported by the UE.

Aspect 7: The method of any of Aspects 1-6, wherein the padding bits are located at an end of the multicast DCI message.

Aspect 8: The method of any of Aspects 1-6, wherein the RRC signaling further indicates a location of the padding bits in the multicast DCI message based at least in part on a set of features supported by the UE.

Aspect 9: The method of any of Aspects 1-8, wherein the number of padding bits is zero or more.

Aspect 10: The method of any of Aspects 1-9, wherein interpreting the multicast DCI message includes: determining that one or more features that enable a capability to decode a PDSCH scheduled by the multicast DCI message are unsupported; and determining whether to decode the PDSCH based at least in part on a value of one or more bits in the multicast DCI message that are associated with the one or more features that enable the capability to decode the PDSCH scheduled by the multicast DCI message.

Aspect 11: The method of Aspect 10, further comprising: refraining from decoding the PDSCH scheduled by the multicast DCI message based at least in part on the value of the one or more bits failing to satisfy a condition.

Aspect 12: The method of Aspect 11, further comprising: determining a HARQ-ACK codebook to carry HARQ-ACK feedback for the PDSCH based at least in part on a downlink assignment index associated with the multicast DCI message; and transmitting, to the base station, the HARQ-ACK codebook with HARQ-ACK feedback for the PDSCH scheduled by the multicast DCI message based at least in part on the HARQ-ACK codebook carrying HARQ-ACK feedback for at least one other PDSCH.

Aspect 13: The method of Aspect 11, further comprising: determining a HARQ-ACK codebook to carry HARQ-ACK feedback for the PDSCH based at least in part on a downlink assignment index associated with the multicast DCI message; and refraining from transmitting the HARQ-ACK codebook based at least in part on the HARQ-ACK codebook carrying HARQ-ACK feedback only for the PDSCH scheduled by the multicast DCI message.

Aspect 14: The method of Aspect 10, further comprising: decoding the PDSCH scheduled by the multicast DCI message based at least in part on the value of the one or more bits satisfying a condition.

Aspect 15: A method of wireless communication performed by a base station, comprising: transmitting, to a UE, RRC signaling indicating one or more parameters related to a size of multicast DCI; and transmitting, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

Aspect 16: The method of Aspect 15, wherein the RRC signaling configures the UE to ignore the number of padding bits based at least in part on the RRC signaling having a unicast configuration.

Aspect 17: The method of any of Aspects 15-16, wherein the number of padding bits is based at least in part on one or more features supported by the UE based at least in part on the RRC signaling having a unicast configuration.

Aspect 18: The method of Aspect 15, wherein the RRC signaling configures the UE to derive a UE-specific number of padding bits and to ignore the UE-specific number of padding bits based at least in part on the RRC signaling having a broadcast configuration.

Aspect 19: The method of Aspect 18, wherein the RRC signaling indicates different numbers of padding bits that are based at least in part on features supported by different UEs.

Aspect 20: The method of Aspect 18, wherein the RRC signaling indicates a baseline number of padding bits based at least in part on a minimum set of features and further indicates a set of fields enabled in the multicast DCI that are related to enhanced features.

Aspect 21: The method of any of Aspects 15-20, wherein the padding bits are located at an end of the multicast DCI message.

Aspect 22: The method of any of Aspects 15-20, wherein the RRC signaling further indicates a location of the padding bits in the multicast DCI message based at least in part on a set of features supported by the UE.

Aspect 23: The method of any of Aspects 15-22, wherein the number of padding bits is zero or more.

Aspect 24: The method of any of Aspects 15-23, wherein one or more bits in the multicast DCI message have a value associated with one or more features that enable a capability to decode a PDSCH scheduled by the multicast DCI message.

Aspect 25: The method of Aspect 24, further comprising: receiving, from the UE, a HARQ-ACK codebook that includes HARQ-ACK feedback for the PDSCH scheduled by the multicast DCI message.

Aspect 26: An apparatus for wireless communication at a device, comprising a processor; memory coupled with the processor; and instructions stored in the memory and executable by the processor to cause the apparatus to perform the method of one or more of Aspects 1-14.

Aspect 27: A device for wireless communication, comprising a memory and one or more processors coupled to the memory, the one or more processors configured to perform the method of one or more of Aspects 1-14.

Aspect 28: An apparatus for wireless communication, comprising at least one means for performing the method of one or more of Aspects 1-14.

Aspect 29: A non-transitory computer-readable medium storing code for wireless communication, the code comprising instructions executable by a processor to perform the method of one or more of Aspects 1-14.

Aspect 30: A non-transitory computer-readable medium storing a set of instructions for wireless communication, the set of instructions comprising one or more instructions that, when executed by one or more processors of a device, cause the device to perform the method of one or more of Aspects 1-14.

Aspect 27: An apparatus for wireless communication at a device, comprising a processor; memory coupled with the processor; and instructions stored in the memory and executable by the processor to cause the apparatus to perform the method of one or more of Aspects 15-25.

Aspect 28: A device for wireless communication, comprising a memory and one or more processors coupled to the memory, the one or more processors configured to perform the method of one or more of Aspects 15-25.

Aspect 29: An apparatus for wireless communication, comprising at least one means for performing the method of one or more of Aspects 15-25.

Aspect 30: A non-transitory computer-readable medium storing code for wireless communication, the code comprising instructions executable by a processor to perform the method of one or more of Aspects 15-25.

Aspect 31: A non-transitory computer-readable medium storing a set of instructions for wireless communication, the set of instructions comprising one or more instructions that, when executed by one or more processors of a device, cause the device to perform the method of one or more of Aspects 15-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, configured to:
        receive, from a base station, radio resource control (RRC) signaling indicating one or more parameters related to a bit size of multicast downlink control information (DCI);
        receive, from the base station, a multicast DCI message that includes a set of fields to indicate a set of communication parameters; and
        interpret the multicast DCI message that indicates the set of communication parameters based at least in part on a number of padding bits in the multicast DCI message, wherein the number of padding bits is based at least in part on the one or more parameters related to the bit size of the multicast DCI.

2. The UE of claim 1, wherein the one or more processors, to interpret the multicast DCI message, are configured to:
    ignore the number of padding bits based at least in part on the RRC signaling having a unicast configuration.

3. The UE of claim 1, wherein the number of padding bits is based at least in part on one or more features supported by the UE based at least in part on the RRC signaling having a unicast configuration.

4. The UE of claim 1, wherein the one or more processors, to interpret the multicast DCI message, are configured to:
derive a UE-specific number of padding bits based at least in part on the RRC signaling having a broadcast configuration; and
ignore the UE-specific number of padding bits.

5. The UE of claim 4, wherein:
the RRC signaling indicates different numbers of padding bits that are based at least in part on features supported by different UEs, and
the one or more processors, to derive the UE-specific number of padding bits, are configured to determine, among the different numbers of padding bits, the UE-specific number of padding bits based at least in part on one or more features supported by the UE.

6. The UE of claim 4, wherein:
the RRC signaling indicates a baseline number of padding bits based at least in part on a minimum set of features and further indicates a set of fields enabled in the multicast DCI that are related to enhanced features, and
the one or more processors, to derive the UE-specific number of padding bits, are configured to reduce the baseline number of padding bits to determine the UE-specific number of padding bits based at least in part on a bit size associated with one or more of the set of fields that are related to enhanced features supported by the UE.

7. The UE of claim 1, wherein the padding bits are located at an end of the multicast DCI message.

8. The UE of claim 1, wherein the RRC signaling further indicates a location of the padding bits in the multicast DCI message based at least in part on a set of features supported by the UE.

9. The UE of claim 1, wherein the number of padding bits is zero or more.

10. The UE of claim 1, wherein the one or more processors, to interpret the multicast DCI message, are configured to:
determine that one or more features that enable a capability to decode a physical downlink shared channel (PDSCH) scheduled by the multicast DCI message are unsupported; and
determine whether to decode the PDSCH based at least in part on a value of one or more bits in the multicast DCI message that are associated with the one or more features that enable the capability to decode the PDSCH scheduled by the multicast DCI message.

11. The UE of claim 10, wherein the one or more processors are further configured to:
refrain from decoding the PDSCH scheduled by the multicast DCI message based at least in part on the value of the one or more bits failing to satisfy a condition.

12. The UE of claim 10, wherein the one or more processors are further configured to:
determine a hybrid automatic repeat request acknowledgement (HARQ-ACK) codebook to carry HARQ-ACK feedback for the PDSCH based at least in part on a downlink assignment index associated with the multicast DCI message; and
transmit, to the base station, the HARQ-ACK codebook with HARQ-ACK feedback for the PDSCH scheduled by the multicast DCI message based at least in part on the HARQ-ACK codebook carrying HARQ-ACK feedback for at least one other PDSCH.

13. The UE of claim 11, wherein the one or more processors are further configured to:
determine a hybrid automatic repeat request acknowledgement (HARQ-ACK) codebook to carry HARQ-ACK feedback for the PDSCH based at least in part on a downlink assignment index associated with the multicast DCI message; and
refrain from transmitting the HARQ-ACK codebook based at least in part on the HARQ-ACK codebook carrying HARQ-ACK feedback only for the PDSCH scheduled by the multicast DCI message.

14. The UE of claim 10, wherein the one or more processors are further configured to:
decode the PDSCH scheduled by the multicast DCI message based at least in part on the value of the one or more bits satisfying a condition.

15. A base station for wireless communication, comprising:
one or more memories; and
one or more processors operatively coupled to the one or more memories, the one or more processors configured to:
transmit, to a user equipment (UE), radio resource control (RRC) signaling indicating one or more parameters related to a bit size of multicast downlink control information (DCI); and
transmit, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

16. The base station of claim 15, wherein the RRC signaling configures the UE to ignore the number of padding bits based at least in part on the RRC signaling having a unicast configuration.

17. The base station of claim 15, wherein the number of padding bits is based at least in part on one or more features supported by the UE based at least in part on the RRC signaling having a unicast configuration.

18. The base station of claim 15, wherein the RRC signaling configures the UE to derive a UE-specific number of padding bits and to ignore the UE-specific number of padding bits based at least in part on the RRC signaling having a broadcast configuration.

19. The base station of claim 18, wherein the RRC signaling indicates different numbers of padding bits that are based at least in part on features supported by different UEs.

20. The base station of claim 18, wherein the RRC signaling indicates a baseline number of padding bits based at least in part on a minimum set of features and further indicates a set of fields enabled in the multicast DCI that are related to enhanced features.

21. The base station of claim 15, wherein the padding bits are located at an end of the multicast DCI message.

22. The base station of claim 15, wherein the RRC signaling further indicates a location of the padding bits in the multicast DCI message based at least in part on a set of features supported by the UE.

23. The base station of claim 15, wherein the number of padding bits is zero or more.

24. The base station of claim 15, wherein one or more bits in the multicast DCI message have a value associated with one or more features that enable a capability to decode a physical downlink shared channel (PDSCH) scheduled by the multicast DCI message.

25. The base station of claim 24 wherein the one or more processors are further configured to:

receive, from the UE, a hybrid automatic repeat request acknowledgement (HARQ-ACK) codebook that includes HARQ-ACK feedback for the PDSCH scheduled by the multicast DCI message.

26. A method of wireless communication performed by a user equipment (UE), comprising:
receiving, from a base station, radio resource control signaling indicating one or more parameters related to a bit size of multicast downlink control information (DCI);
receiving, from the base station, a multicast DCI message that includes a set of fields to indicate a set of communication parameters; and
interpreting the multicast DCI message that indicates the set of communication parameters based at least in part on a number of padding bits in the multicast DCI message, wherein the number of padding bits is based at least in part on the one or more parameters related to the bit size of the multicast DCI.

27. The method of claim 26, wherein the number of padding bits indicated in the RRC signaling is based at least in part on one or more features supported by the UE based at least in part on the RRC signaling having a unicast configuration.

28. The method of claim 26, wherein interpreting the multicast DCI message includes:
deriving a UE-specific number of padding bits based at least in part on the RRC signaling having a broadcast configuration; and
ignoring the UE-specific number of padding bits.

29. The method of claim 26, wherein a location of the padding bits is at an end of the multicast DCI message or indicated in the RRC signaling based at least in part on a set of features supported by the UE.

30. A method of wireless communication performed by a base station, comprising:
transmitting, to a user equipment (UE), radio resource control (RRC) signaling indicating one or more parameters related to a bit size of multicast downlink control information (DCI); and
transmitting, to the UE, a multicast DCI message that includes a set of fields to indicate a set of communication parameters, wherein the RRC signaling configures the UE to interpret the multicast DCI message that indicates the set of communication parameters based at least in part on a number of padding bits in the multicast DCI message.

* * * * *